United States Patent
Kim et al.

(10) Patent No.: US 12,428,237 B2
(45) Date of Patent: Sep. 30, 2025

(54) OBJECT PROCESSING SYSTEMS AND METHODS WITH MULTI-OBJECT SHUTTLING

(71) Applicant: Berkshire Grey Operating Company, Inc., Bedford, MA (US)

(72) Inventors: Dongshin Kim, Woburn, MA (US); Jacob Torrey, Tyngsboro, MA (US); Jeffrey Kittredge, Lexington, MA (US); Jessica Scolnic, Newton, MA (US); Joshua Best, Raleigh, NC (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 69 days.

(21) Appl. No.: 18/131,618

(22) Filed: Apr. 6, 2023

(65) Prior Publication Data
US 2023/0322495 A1 Oct. 12, 2023

Related U.S. Application Data

(60) Provisional application No. 63/328,109, filed on Apr. 6, 2022.

(51) Int. Cl.
*B65G 35/06* (2006.01)
*B65G 47/40* (2006.01)

(52) U.S. Cl.
CPC ............. *B65G 35/06* (2013.01); *B65G 47/40* (2013.01); *B65G 2812/12* (2013.01)

(58) Field of Classification Search
CPC .... B65G 35/06; B65G 47/40; B65G 2812/12; B65G 1/1378; B65G 2201/0285; B07C 5/36
See application file for complete search history.

(56) References Cited

U.S. PATENT DOCUMENTS

| | | |
|---|---|---|
| 4,722,430 A | 2/1988 | Canziani |
| 4,846,335 A | 7/1989 | Hartlepp |
| 4,989,719 A | 2/1991 | Ballestrazzi et al. |
| 5,082,103 A | 1/1992 | Ross et al. |
| 5,419,457 A | 5/1995 | Ross et al. |
| 5,839,566 A | 11/1998 | Bonnet |

(Continued)

FOREIGN PATENT DOCUMENTS

| | | |
|---|---|---|
| AU | 2006204622 A1 | 3/2007 |
| CN | 102390701 A | 3/2012 |

(Continued)

OTHER PUBLICATIONS

IPSearch History May 21, 2025 UTC; InnovationQ+; https://iq.ip.com/discover (Year: 2025).*

(Continued)

*Primary Examiner* — Gene O Crawford
*Assistant Examiner* — Abby A Jorgensen
(74) *Attorney, Agent, or Firm* — Gesmer Updegrove LLP

(57) ABSTRACT

A carrier system is disclosed for use in an object processing system. The carrier system includes a carrier body including a plurality of containment areas for respectively receiving a plurality of objects at a loading station, a motion actuator for moving the carrier body from the loading station to a distribution area, and an ejection actuation system for actuating the carrier body to deposit each of the plurality of objects into different destination locations.

28 Claims, 32 Drawing Sheets

(56) References Cited

U.S. PATENT DOCUMENTS

| | | |
|---|---|---|
| 6,208,908 B1 | 3/2001 | Boyd et al. |
| 6,246,023 B1 | 6/2001 | Kugle |
| 6,323,452 B1 | 11/2001 | Bonnet |
| 6,688,459 B1 | 2/2004 | Bonham et al. |
| 6,762,382 B1 | 7/2004 | Danelski |
| 6,897,395 B2 | 5/2005 | Shiibashi et al. |
| 9,102,336 B2 | 8/2015 | Rosenwinkel |
| 9,481,518 B2 | 11/2016 | Neiser |
| 2004/0112712 A1 | 6/2004 | Brooks et al. |
| 2004/0232056 A1 | 11/2004 | Groot et al. |
| 2004/0261366 A1 | 12/2004 | Gillet et al. |
| 2005/0167343 A1 | 8/2005 | Avishay |
| 2005/0220600 A1 | 10/2005 | Baker et al. |
| 2005/0274589 A1 | 12/2005 | Groot et al. |
| 2006/0045672 A1 | 3/2006 | Maynard et al. |
| 2006/0070929 A1 | 4/2006 | Fry et al. |
| 2006/0260908 A1 | 11/2006 | Affaticati |
| 2007/0005179 A1 | 1/2007 | Mccrackin et al. |
| 2007/0175734 A1* | 8/2007 | Stang Hauge ............ B07C 5/36 198/706 |
| 2010/0122942 A1 | 5/2010 | Harres et al. |
| 2011/0144798 A1 | 6/2011 | Freudelsperger |
| 2011/0238207 A1 | 9/2011 | Bastian, II et al. |
| 2011/0320036 A1 | 12/2011 | Freudelsperger |
| 2013/0126304 A1 | 5/2013 | Stikkelorum |
| 2014/0142746 A1 | 5/2014 | Vegh et al. |
| 2014/0262687 A1 | 9/2014 | Kilper |
| 2014/0291112 A1 | 10/2014 | Lyon et al. |
| 2015/0306634 A1 | 10/2015 | Maeda et al. |
| 2016/0244262 A1 | 8/2016 | O'Brien et al. |
| 2017/0157648 A1 | 6/2017 | Wagner et al. |
| 2017/0320102 A1 | 11/2017 | McVaugh et al. |
| 2018/0127219 A1* | 5/2018 | Wagner .................. B65G 47/49 |
| 2018/0148272 A1* | 5/2018 | Wagner .................. B65G 47/22 |
| 2018/0273298 A1 | 9/2018 | Wagner et al. |
| 2020/0130951 A1 | 4/2020 | Wagner et al. |
| 2021/0039140 A1 | 2/2021 | Geyer et al. |
| 2021/0276796 A1 | 9/2021 | Long |
| 2022/0348409 A1 | 11/2022 | Sun et al. |
| 2022/0356017 A1 | 11/2022 | Romano et al. |
| 2023/0077893 A1 | 3/2023 | Gebhardt et al. |
| 2023/0112778 A1 | 4/2023 | O'Hern et al. |
| 2023/0219767 A1 | 7/2023 | Demir et al. |
| 2024/0033780 A1 | 2/2024 | Wagner et al. |

FOREIGN PATENT DOCUMENTS

| | | | |
|---|---|---|---|
| CN | 102112380 B | 7/2013 | |
| CN | 103387120 A | 11/2013 | |
| CN | 103143510 B | 7/2014 | |
| CN | 104444299 A | 3/2015 | |
| CN | 102849423 B | 8/2015 | |
| CN | 104858150 A | 8/2015 | |
| CN | 105035677 B | 9/2016 | |
| CN | 118973724 A | 11/2024 | |
| DE | 102004001181 A1 | 8/2005 | |
| DE | 102004013353 A1 | 10/2005 | |
| DE | 102014111396 A1 | 2/2016 | |
| EP | 0633208 A1 * | 1/1995 | |
| EP | 0613841 B1 | 2/1998 | |
| EP | 1695927 B1 | 10/2008 | |
| EP | 2161225 A1 * | 3/2010 | ............ B07C 5/36 |
| EP | 3112295 A1 | 1/2017 | |
| EP | 3722013 A1 * | 10/2020 | ............ B07C 3/08 |
| JP | 2002028577 A | 1/2002 | |
| WO | 9523750 A1 | 9/1995 | |
| WO | 2008091733 A2 | 7/2008 | |
| WO | WO-2014038960 A1 * | 3/2014 | ............ B07C 5/36 |
| WO | WO-2020152204 A1 * | 7/2020 | ............ B07C 3/082 |
| WO | WO-2020185081 A1 * | 9/2020 | ............ B07C 3/02 |
| WO | 2023196491 A1 | 10/2023 | |

OTHER PUBLICATIONS

International Preliminary Report on Patentability issued by the International Bureau of WIPO in related international application No. PCT/US2023/017722 on Oct. 8, 2024, 9 pages.

Notification of Transmittal of the International Search Report and the Written Opinion of the International Searching Authority along with the International Search Report and the Written Opinion of the International Searching Authority (the European Patent Office) issued in related International applicatioln No. PCT/US2023/017722 on Aug. 2, 2023, 15 pages.

* cited by examiner

OBJECT PROCESSING SYSTEMS AND METHODS WITH MULTI-OBJECT SHUTTLING

PRIORITY

The present application claims priority to U.S. Provisional Patent Application No. 63/328,109, filed Apr. 6, 2022, the disclosure of which is hereby incorporated by reference in its entirety.

BACKGROUND

The invention generally relates to object processing systems and relates, in particular, to object processing systems such as automated storage and retrieval systems, distribution center systems, and sortation systems that are used for processing a variety of objects.

Current object processing systems generally involve the processing of a large number of objects, where the objects are received in either organized or disorganized batches. The objects must be routed to desired destinations in accordance with a manifest or in accordance with specific addresses on the objects (e.g., in a mailing system).

Automated storage and retrieval systems (AS/RS), for example, generally include computer-controlled systems for automatically storing (placing) and retrieving items from defined storage locations. Traditional AS/RS typically employ totes (or bins), which are the smallest unit of load for the system. In these systems, the totes are brought to people or robots who pick individual items out of the totes. When a person has picked the required number of items out of the tote, the tote is then re-inducted back into the AS/RS.

Current distribution center sorting systems, for example, generally assume an inflexible sequence of operations whereby a disorganized stream of input objects is first singulated into a single stream of isolated objects presented one at a time to a scanner that identifies the object. An induction element (e.g., a conveyor, a tilt tray, or manually movable bins) transport the objects to the desired destination or further processing station, which may be a bin, an inclined shelf, a chute, a bag or a conveyor, etc.

In typical parcel sortation systems, human workers or automated systems typically retrieve parcels in an arrival order and sort each parcel or object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin.

Most current state-of-the-art sortation systems rely on human labor to some extent. Most solutions rely on a worker that is performing singulation or sortation or both, by scanning an object from an induction area (chute, table, etc.) and placing the object in a staging location, conveyor, or collection bin. When a bin is full or the controlling software system determines that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

There remains a need for more efficient and more cost-effective object processing systems that processes objects of a variety of sizes, weights and shapes into appropriate collection bins or boxes, yet is efficient in handling a variety of objects of such varying sizes, weights, and shapes.

SUMMARY

In accordance with an aspect, the invention provides a carrier system for use in an object processing system. The carrier system includes a carrier body including a plurality of containment areas for respectively receiving a plurality of objects at a loading station, a motion actuator for moving the carrier body from the loading station to a distribution area, and an ejection actuation system for actuating the carrier body to deposit each of the plurality of objects into different destination locations.

In accordance with another aspect, the invention provides an object processing system. The object processing system includes an input area including a loading station, a distribution area including a plurality of destination locations, a carrier body including a plurality of containment areas for respectively receiving a plurality of objects at the loading station, a motion actuator for moving the carrier body from the loading station to the distribution area, and an ejection actuation system for actuating the carrier body to deposit each of the plurality of objects into different of the plurality of the destination locations.

In accordance with a further aspect, the invention provides a method of processing objects. The method includes providing an input area including a loading station, providing a distribution area including a plurality of destination locations, receiving at the loading station a plurality of objects in a plurality of containment areas of a carrier body, moving the carrier body from the loading station to the distribution area in a first direction, and actuating the carrier body to deposit each of the plurality of objects into different of the plurality of the destination locations.

BRIEF DESCRIPTION OF THE DRAWINGS

The following description may be further understood with reference to the accompanying drawings in which.

The drawings are shown for illustrative purposes only.

DETAILED DESCRIPTION

The invention provides an efficient and economical object processing system that may be used, for example, for object sortation, distribution and order fulfillment. In accordance with various aspects, the invention provides multiple containment area shuttle systems for applications such as robot package sortation and identification systems (which use shuttles to deliver objects to any of multiple sort destinations), robotic put walls (which for example use two linear slides in a gantry crane mechanism to deliver goods to arrays of destination locations), robot production sortation systems (which deliver objects directly to boxes), as well as other manual product sortation systems.

In accordance with various aspects, the invention provides a carrier system for use in an object processing system, and the carrier system includes a carrier body, a motion actuator, and an ejection actuation system. The carrier body includes a plurality of containment areas for respectively receiving a plurality of objects at a loading station. The motion actuator moves the carrier body from the loading station to a distribution area, and the ejection actuation system actuates the carrier body to deposit each of the plurality of objects into different destination locations.

Figure 1:
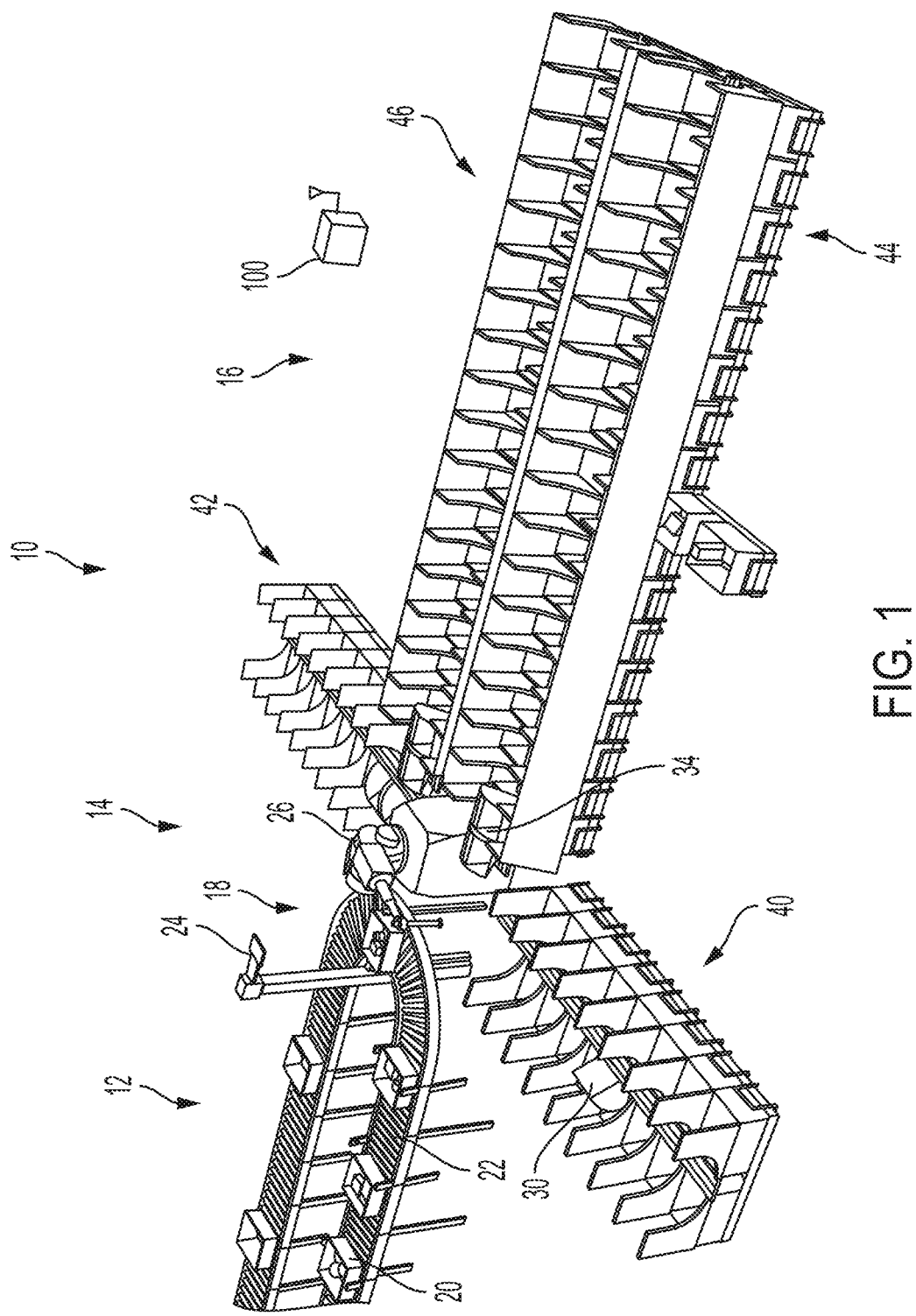
FIG. 1 shows an illustrative diagrammatic view of an object processing system including a carrier system in accordance with an aspect of the present invention.

FIG. 1 shows an object processing system 10 that includes an input area 12, an object processing area 14, and a distribution area 16. The input area 12 includes a loading station 18 proximate the object processing area 14, where objects are presented in bins 20 on an input conveyor 22. Using perception data from a perception system 24, a programmable motion device (e.g., a robot) 26 moves objects to any of a variety of carrier systems 30, 32, 34, 36 (as further shown in FIGS. 2 and 3). Each carrier system 30, 32, 34, 36 moves two or more objects to any of a variety of destination locations among respective shuttle wings 40, 42, 44, 46 respectively. An end-effector 28 of the programmable motion device 26 is employed to grasp and move objects from each bin 20 when positioned at the loading station 18, and to deliver the object to one of the carrier systems 30, 32, 34, 36 for delivery to assigned destination locations among the shuttle wings 40, 42, 44, 46 in accordance with an object manifest. Control of the system, including the programmable motion device 26, the input conveyor 22 and the carrier systems 30, 32, 34, 36 may be provided by one or more computer processing systems 100. Each carrier system 30, 32, 34, 36 includes a carrier body that travels along a respective track 50, 52, 54, 56 of each respective shuttle wing 40, 42, 44, 46, and may be actuated to drop objects into destination locations of the shuttle wings 40, 42, 44, 46. The destination locations include boxes on pull out carts that may be removed manually (one such cart is shown pulled out from shuttle wing 44 in FIG. 1). The carrier systems 30, 32, 34, 36 may include a variety of types of carrier bodies, some of which are shown in the system of FIGS. 1-3.

Figure 2:
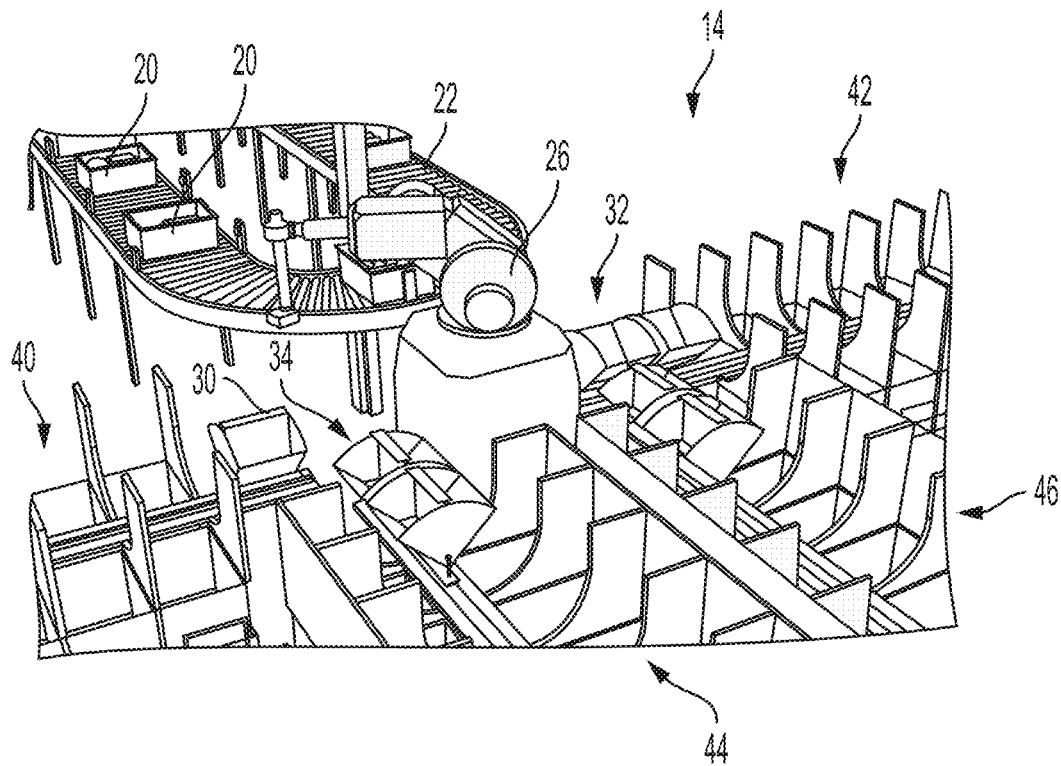
FIG. 2 shows an illustrative diagrammatic enlarged view of the object processing area in the system of FIG. 1.
Figure 3:
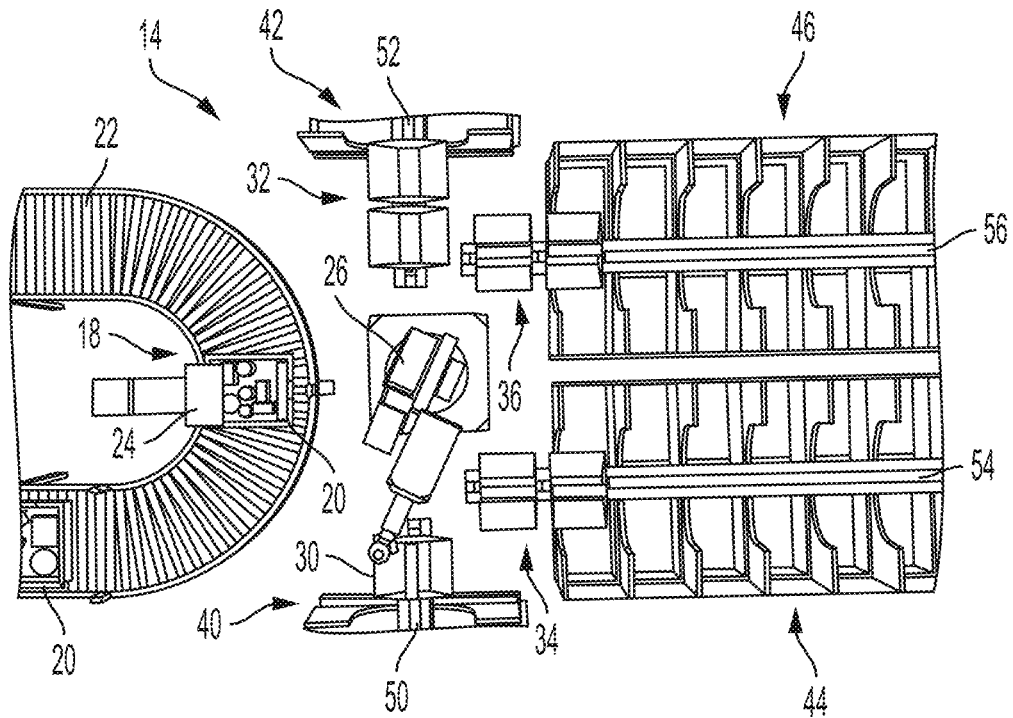
FIG. 3 shows an illustrative diagrammatic plan view of the object processing area of FIG. 2.

FIG. 2, for example, shows a first carrier system 30 that includes a divided carriage, a second carrier system 32 that includes a double carriage, a third carrier system 34 that includes a double carriage each of which is divided and independently actuatable to eject objects, and a fourth carrier system 36 (as further shown in FIG. 3) that includes a double carriage each of which is independently linearly movable and independently actuatable to eject objects. Systems of various aspects of the invention may include any combination of such carrier systems (including all the same type) as the system of FIGS. 1-4F and are shown for diagrammatic and illustrative purposes only.

Figure 4A:
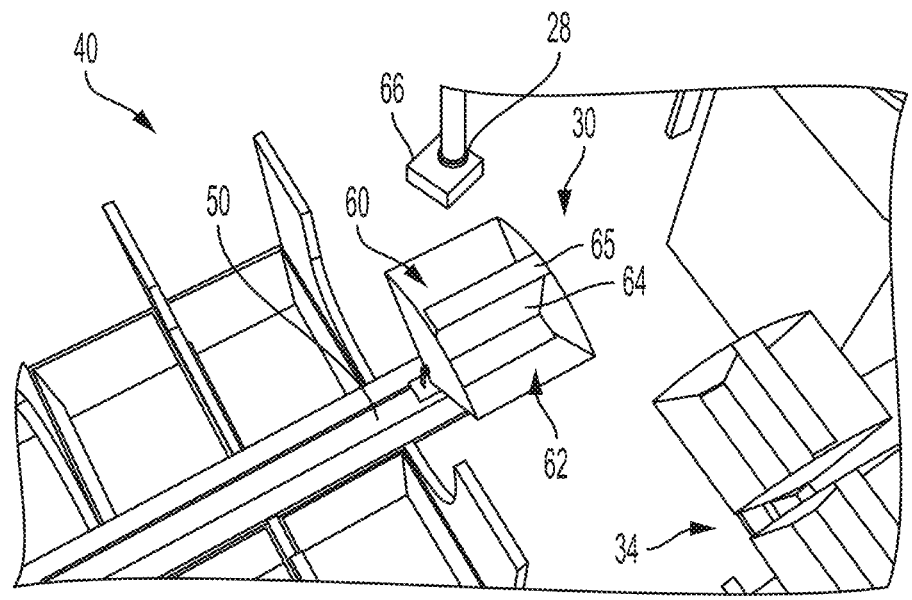
FIGS. 4A-F show illustrative diagrammatic enlarged views of a first wing portion of the system of FIG. 1, showing a first object being loaded into a carrier (FIG. 4A), a second object being loaded into a carrier (FIG. 4B), the second object being discharged from the carrier (FIG. 4C), the first object being discharged from the carrier (FIG. 4D), an enlarged view of the first and second objects in the carrier (FIG. 4E), and the second object being retained by the carrier in the event that the first object is discharged prior to the second object (FIG. 4F)
Figure 4B:
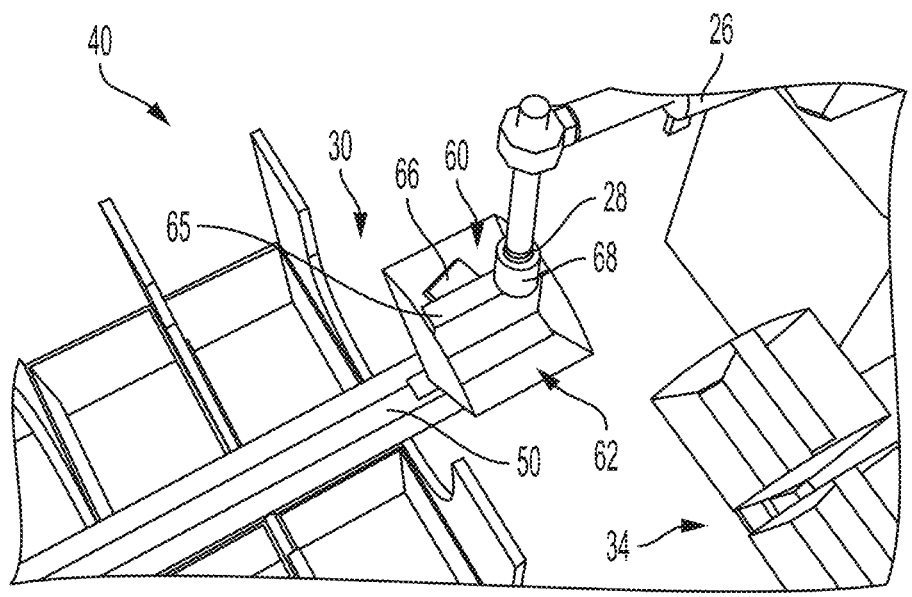
Figure 4C:
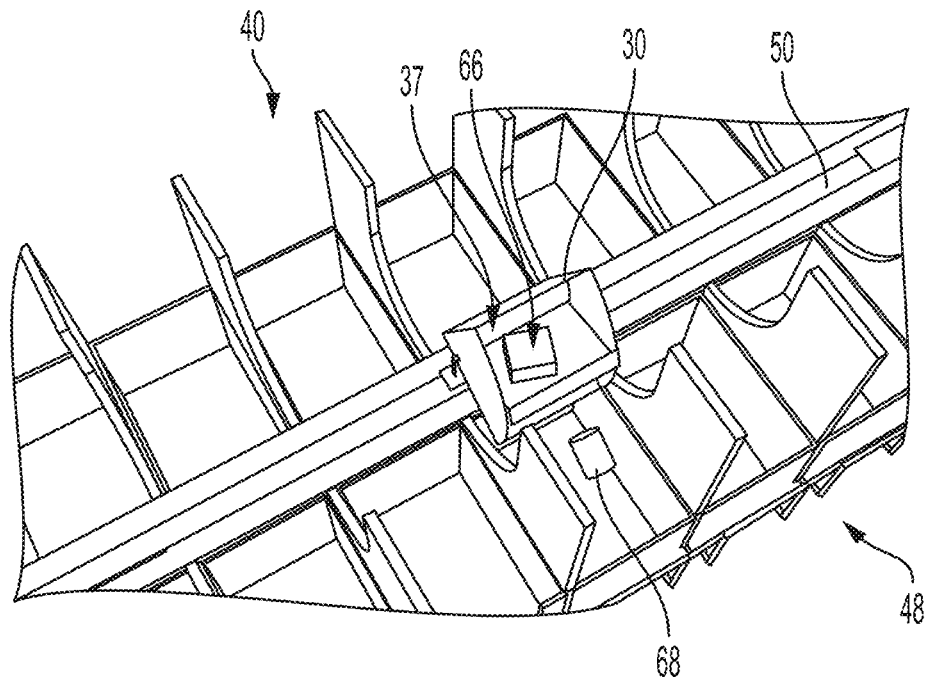
Figure 4D:
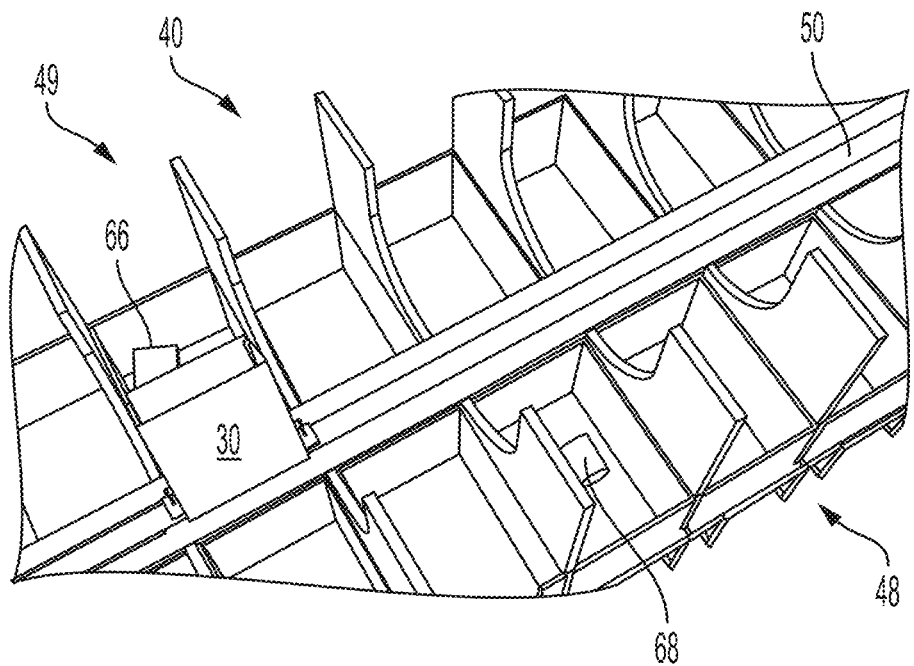

In particular, FIGS. 4A and 4B show the carrier system 30 including the divided carriage, providing two containment areas 60, 62 on either side of a dividing wall 64. A first object 66 may be placed by the end-effector 28 into one containment area 60 (shown in FIG. 4A), and a second object 68 may thereafter be placed by the end-effector into the other containment area 62 (shown in FIG. 4B). With reference to FIGS. 4C and 4D, one object (e.g., 68) may be deposited into a first destination location 48 (as shown in FIG. 4C), and another object (e.g., 66) may be deposited into a second destination location 49 (shown in FIG. 4D). In this case the ejector on the carrier system 30 has two locations that can be filled with SKUs, a left and a right locale. They are filled at the loading station for the carrier system. They are filled by the robot placing directly into one of the two locales. Once one item is filled, the robot control system can decide if the wait is too long to go ahead and fulfill one item; or if the next item is ready, to load the second item. In this instance the ejector's two containment areas 60, 62 are coded to the sides of the carrier body; that is, the left locale only fills left destination locations, and vice versa for the right locale.

Figure 4E:
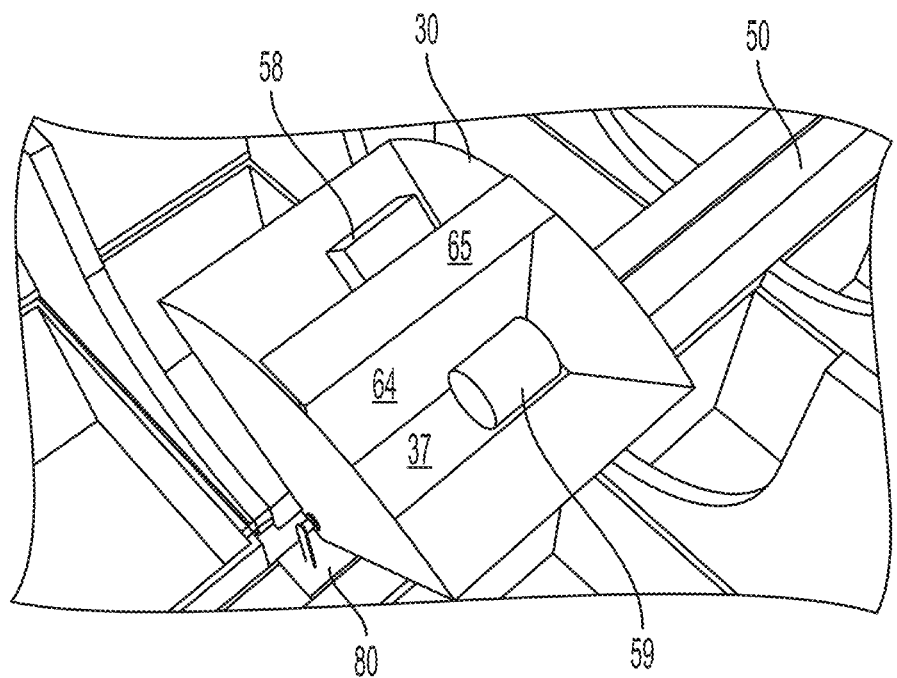
Figure 4F:
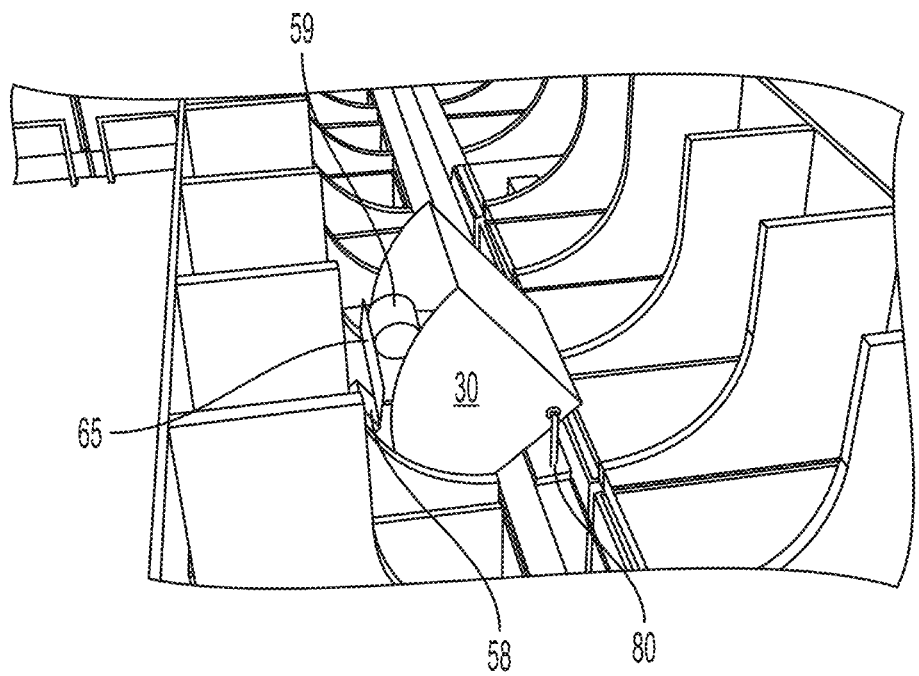

FIGS. 4E and 4F show views of two objects 58, 59 being moved to a first drop location (FIG. 4E), and then dropping one object (e.g., 58) into a destination bin (FIG. 4F). A retention top 65 on the top of the dividing wall 64 acts to stop movement of the object 59 (e.g., from rolling) when the first object 58 is being ejected (as shown in FIG. 4F). The retention top plate 65 may be generally orthogonally disposed with respect to the dividing wall 64. The ejection actuation may be controlled by actuators as discussed below with reference to FIG. 8, and movement of the carrier system 30 (including the track base 80) along the track may be by a belt driven system as discussed below with reference to FIGS. 9 and 10A.

Figure 5A:
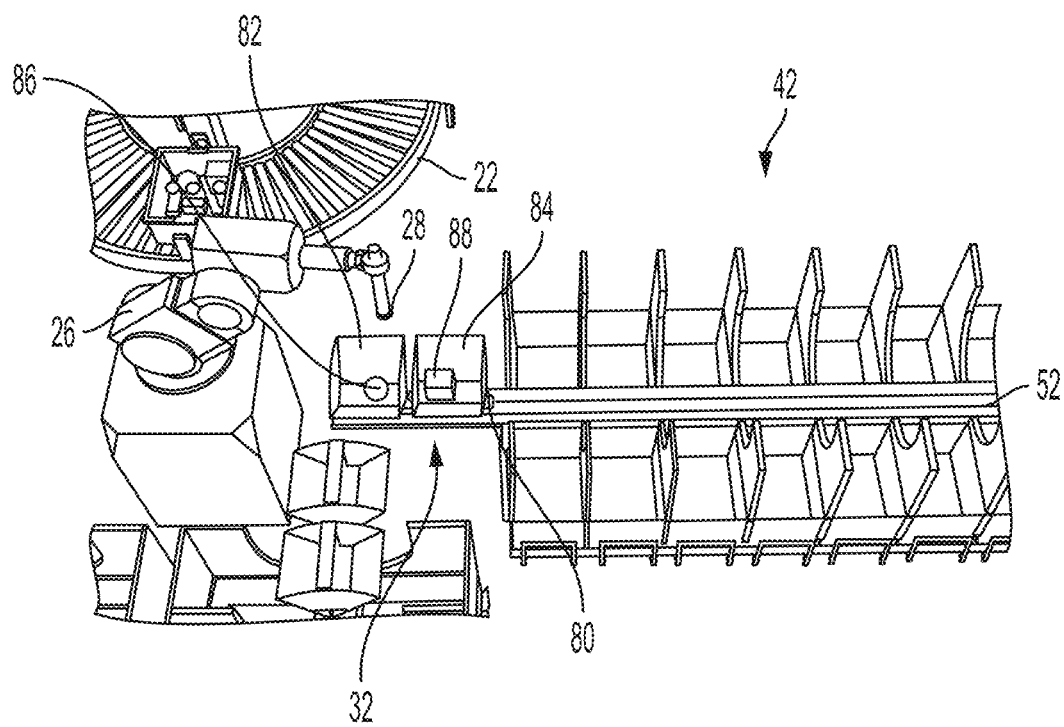
FIGS. 5A-5B show illustrative diagrammatic enlarged views of a second wing portion of the system of FIG. 1, showing first and second objects loaded into a carrier (FIG. 5A), and showing the first and second objects being dislodged together into two different locations (FIG. 5B)
Figure 5B:
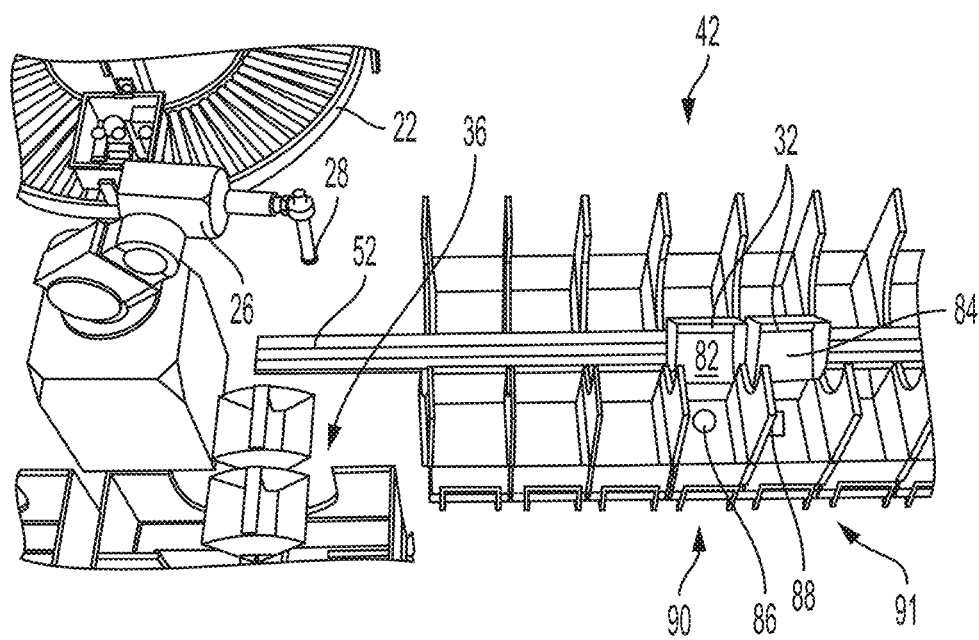

FIGS. 5A and 5B show the carrier system 32 on track 52 of the shuttle wing 42. The carrier system 32 includes two containment areas provided by two carriages 82, 84 that move along the track together and may be actuated to eject objects 86, 88 at the same time into adjacent destination locations 90, 91. The carriages 82, 84 are sized and spaced apart to match the spacing of the destination locations. Again, the ejection actuation may be controlled by actuators as discussed below with reference to FIG. 8, and movement of the carrier system 32 (including the track base 80) along the track may be by a belt driven system as discussed below with reference to FIGS. 9 and 10A.

Figure 6A:
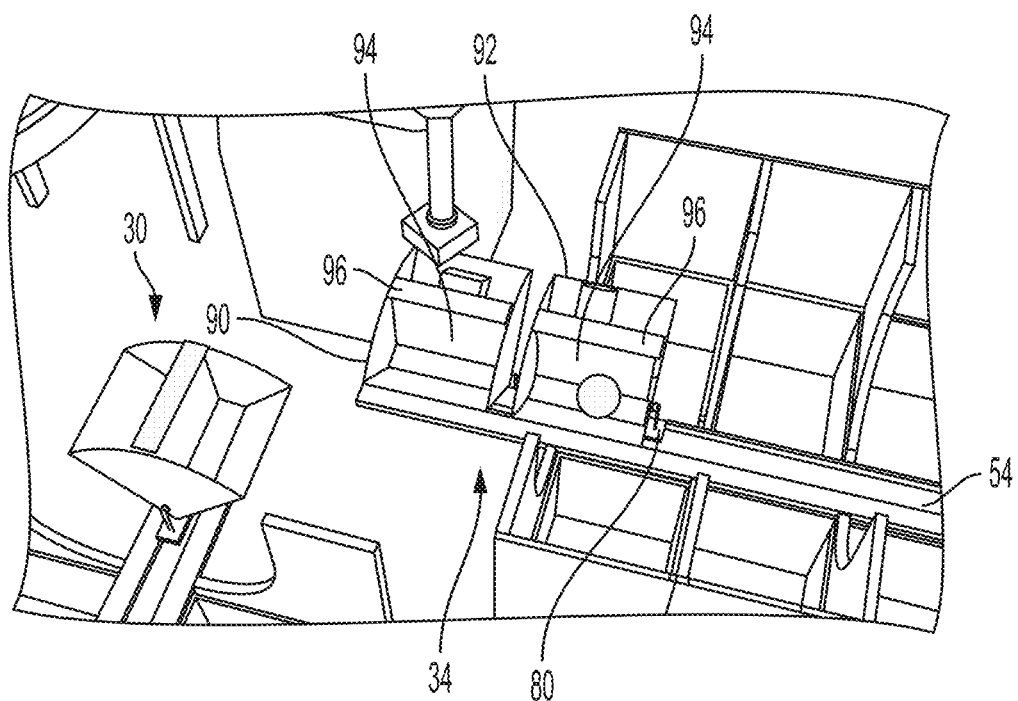
FIGS. 6A-6F show illustrative diagrammatic enlarged views a third wing portion of the system of FIG. 1, showing a fourth object being loaded into a carrier that already includes three objects (FIG. 6A), showing the four objects being transported in the carrier (FIG. 6B), showing two of the objects being discharged at the same time to adjacent locations (FIG. 6C), showing the two remaining objects being discharged at the same time to two adjacent different locations (FIG. 6D), showing one object being discharged into a single location (FIG. 6E), and showing a different object being discharged into a different single location (FIG. 6F)
Figure 6B:
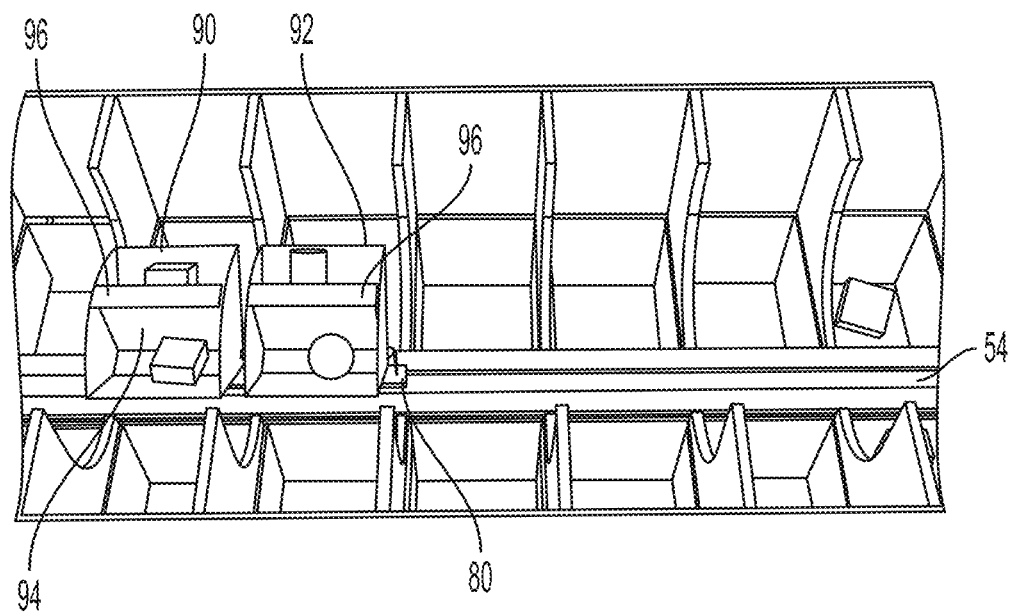
Figure 6C:
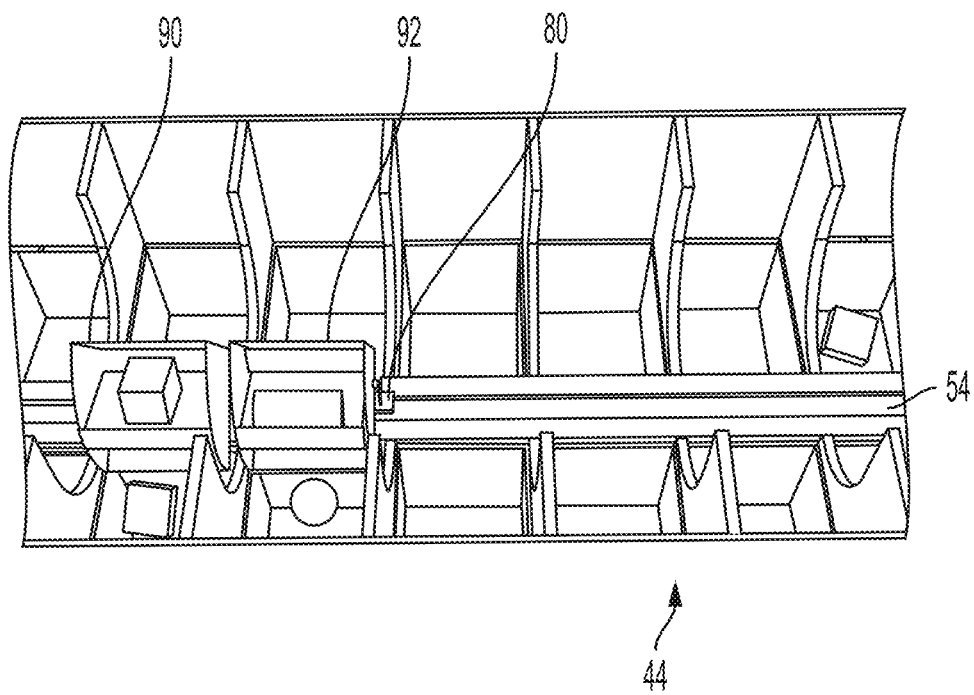
Figure 6D:
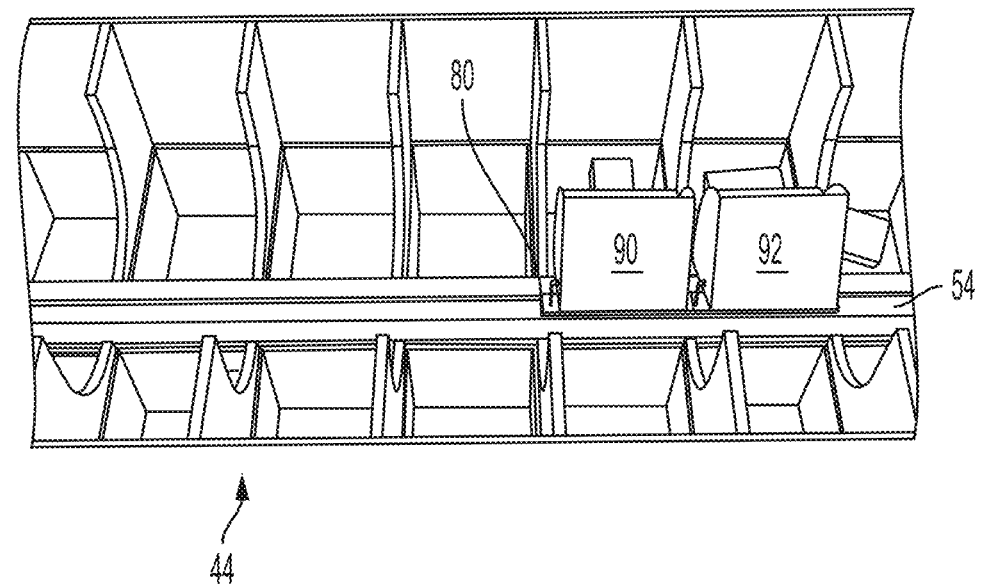
Figure 6E:
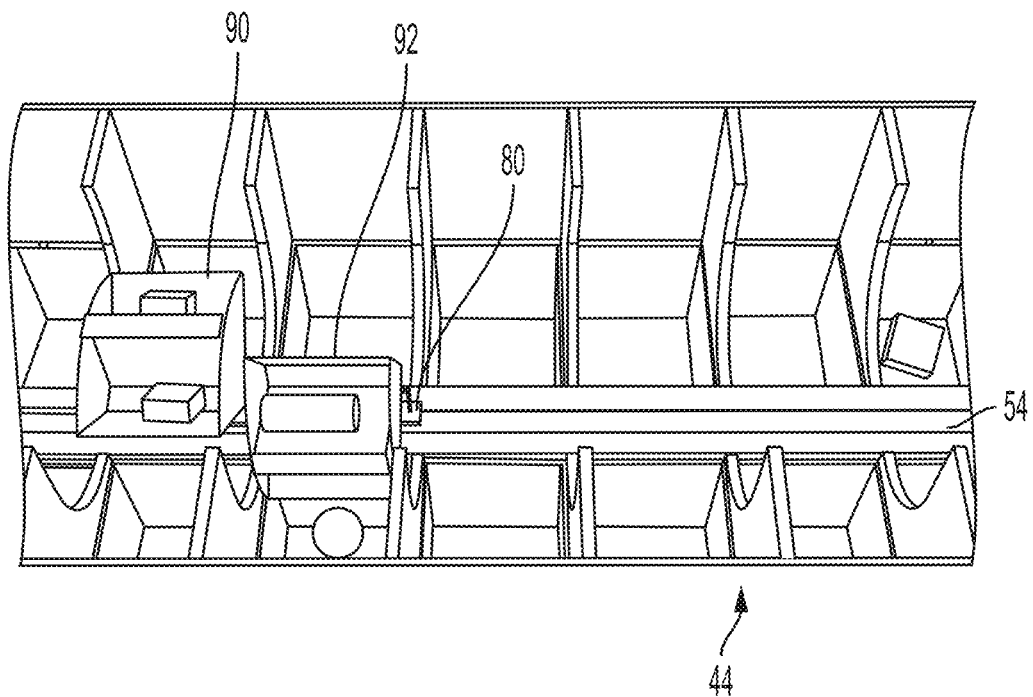
Figure 6F:
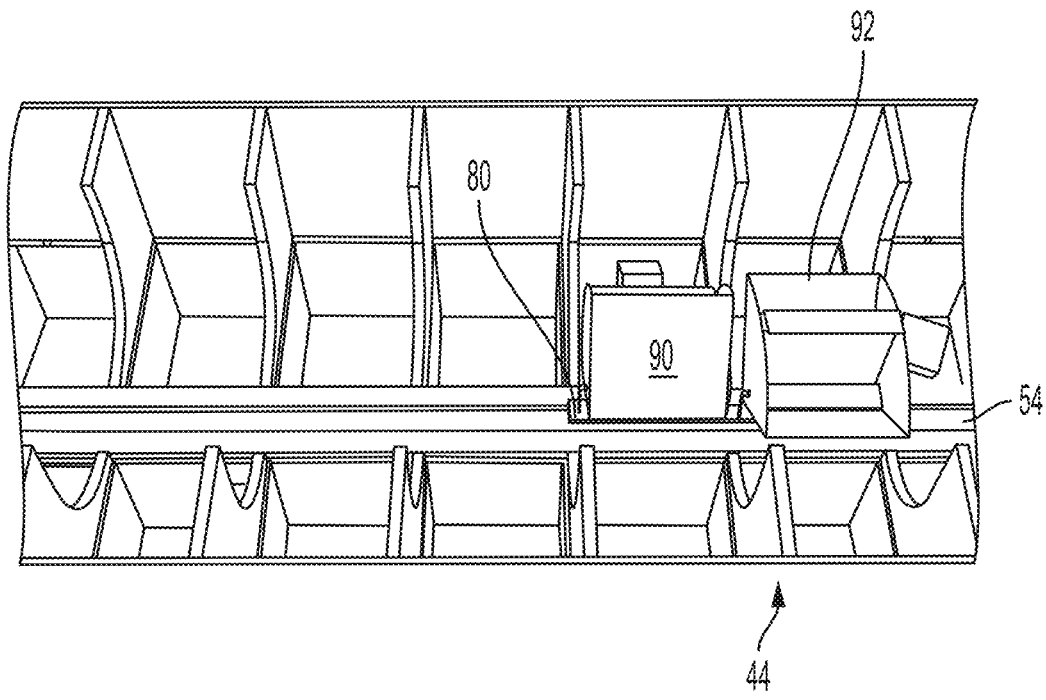

FIGS. 6A and 6B show the carrier system 34 on track 54 of the shuttle wing 44. The carrier system 34 includes four containment areas provided by two carriages 90, 92, each of which is divided by a dividing wall 94 with a retention top 96 as discussed above with reference to FIGS. 4E and 4F. The carriages 90, 92 move along the track 54 together and may be actuated to eject objects therein at the same time into adjacent destination locations as shown in FIGS. 6C and 6D, or may be actuated to eject objects into different destination locations as shown in FIGS. 6E and 6F. Again, the carriages 90, 92 are sized and spaced apart to match the spacing of the destination locations. The ejection actuation may be controlled by actuators as discussed below with reference to FIG. 8, and movement of the carrier system 34 (including the track base 80) along the track may be by a belt driven system as discussed below with reference to FIGS. 9 and 10A.

Figure 7A:
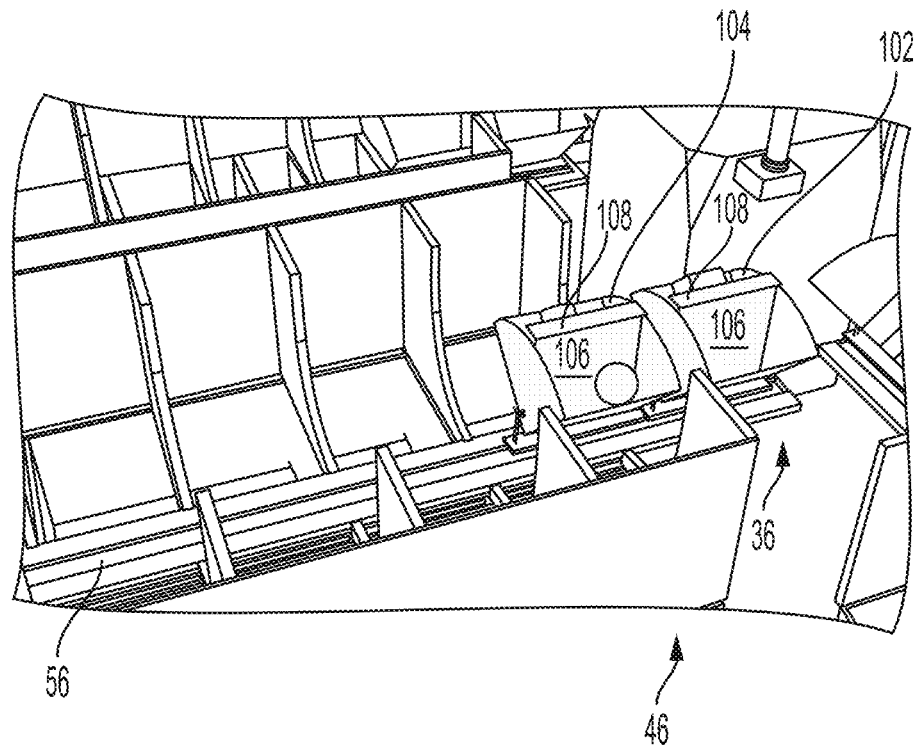
FIGS. 7A-7D show illustrative diagrammatic enlarged views of a fourth wing portion of the system of FIG. 1, showing a fourth object being loaded onto a carrier system that already includes three objects (FIG. 7A), showing a first portion of the carrier system leaving a second portion of the carrier system (FIG. 7B), showing both portions of the carrier system discharging objects to opposite sides of the fourth wing portion (FIG. 7C), and showing both portions of the carrier system discharging objects to reverse opposite sides of the fourth wing portion (FIG. 7D)
Figure 7B:
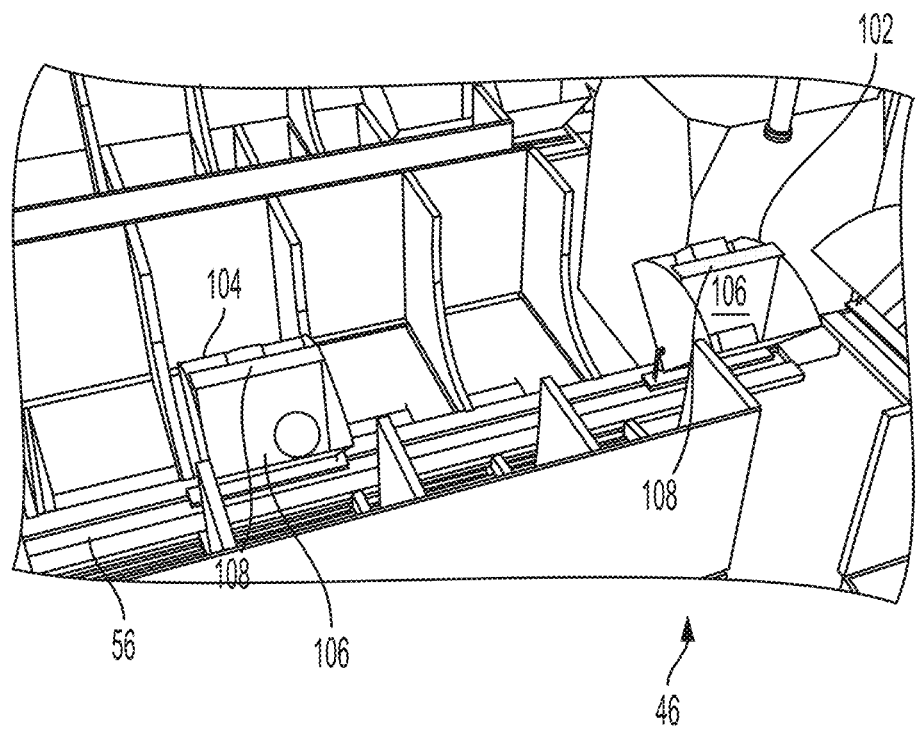
Figure 7C:
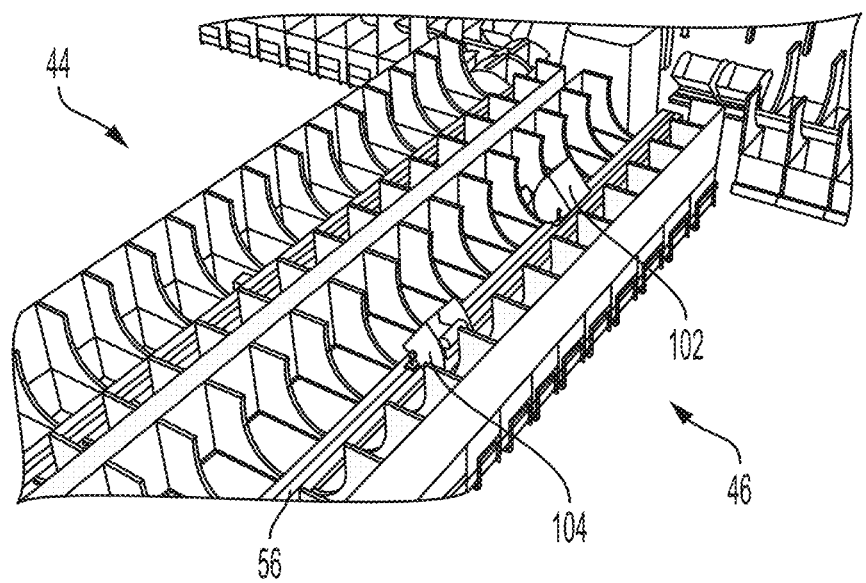
Figure 7D:
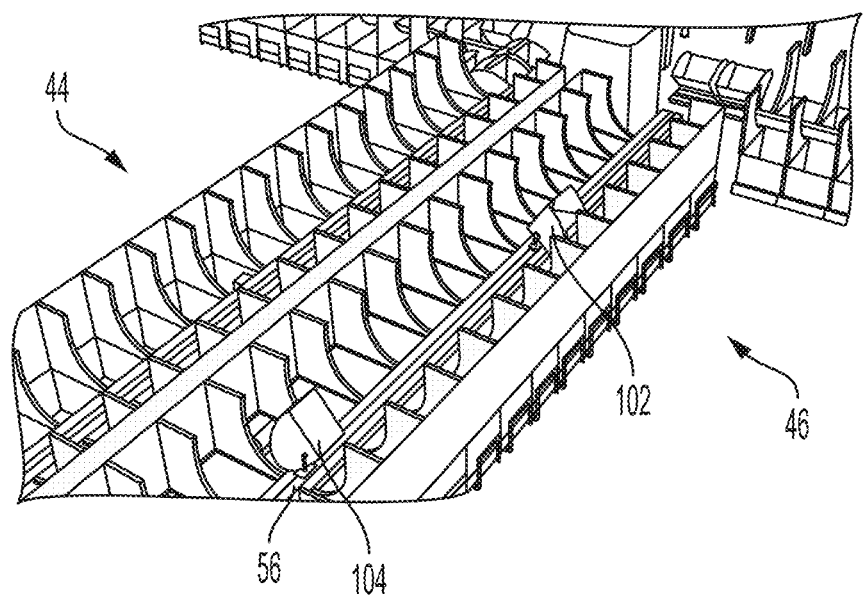

FIGS. 7A and 7B show the carrier system 36 on track 56 of the shuttle wing 46. The carrier system 36 also includes four containment areas provided by two carriages 102, 104, each of which is divided by a dividing wall 106 with a retention top 108 as discussed above with reference to FIGS. 4E and 4F. The carriages 102, 104 move along the track 56 independently except that one carriage 102 remains on one side of the other carriage 104. The system may be programmed, for example, to place objects destined for the closer half of the shuttle wing 46 into the carriage 102, and to place objects destined for the further half of the shuttle wing 46 into the carriage 104. The carriages 102, 104 may be actuated to eject objects into different destination locations as shown in FIGS. 7C and 7D. The ejection actuation may be controlled by actuators as discussed below with reference to FIG. 8, and movement of the carrier system 36 (including the two track bases 81) along the track may be by a pair of belt driven systems as discussed below with reference to FIGS. 9 and 10B.

Figure 8:
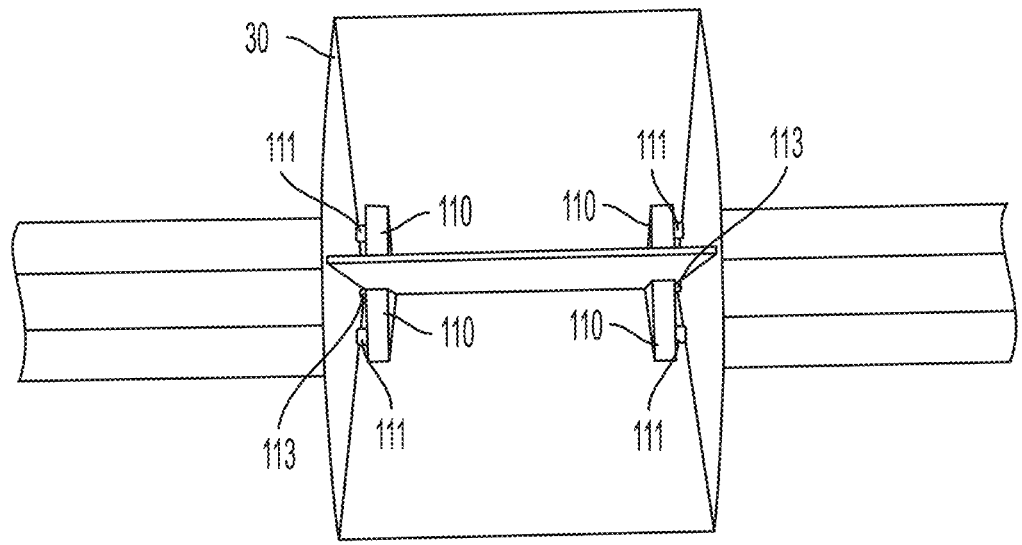
FIG. 8 shows an illustrative diagrammatic elevational view of a carrier system in accordance with an aspect of the present invention showing a carrier actuation system.
Figure 9:
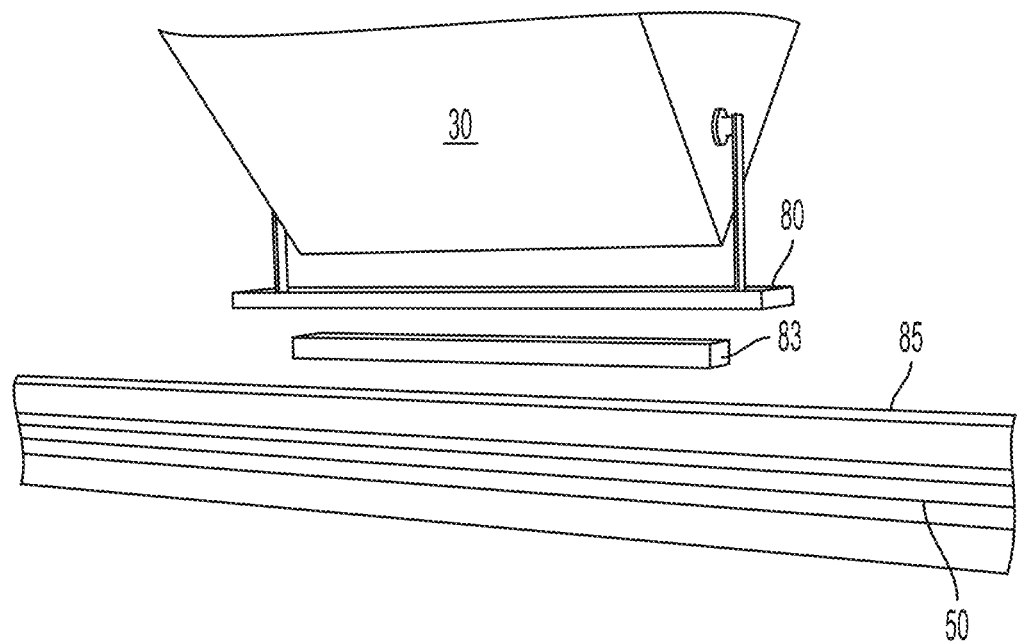
FIG. 9 shows an illustrative diagrammatic exploded side view of the carrier system of FIG. 8 showing the track with a belt and a coupling member for attachment to the carrier.
Figure 10A:
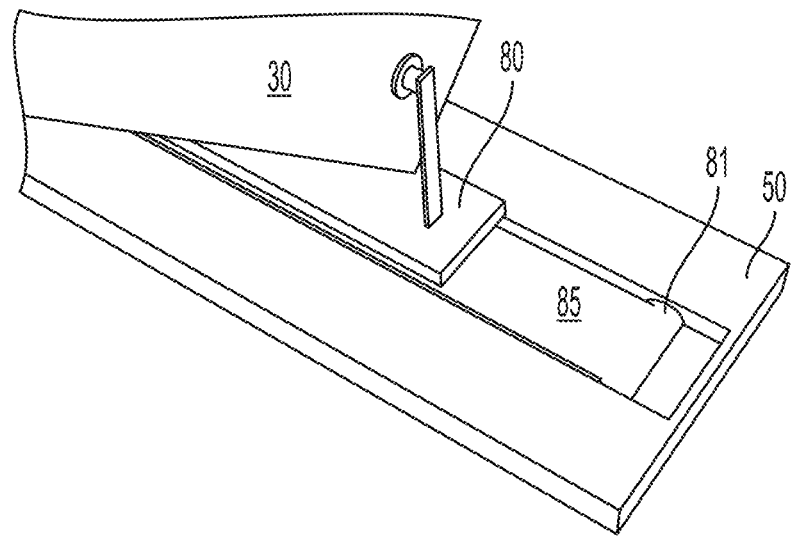
FIGS. 10A and 10B show illustrative diagrammatic views of belt drive systems in accordance with various aspects of the present invention showing a single belt system (FIG. 10A) and a dual belt system (FIG. 10B)
Figure 10B:
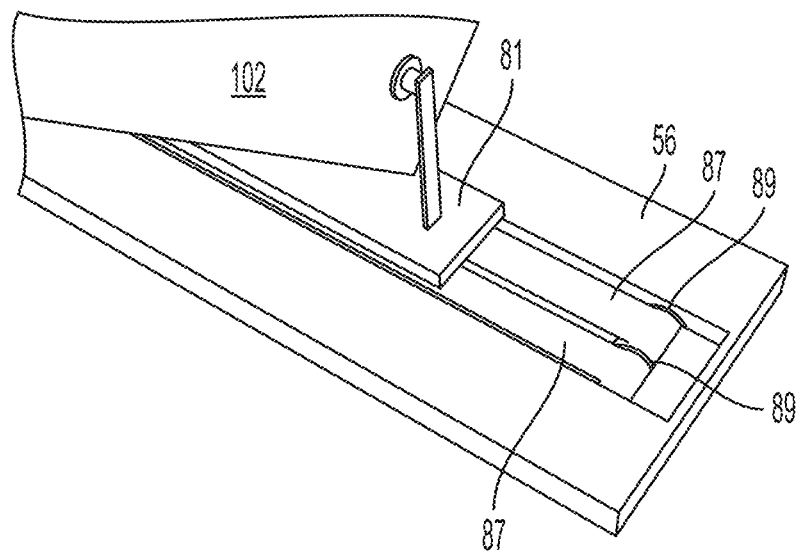

FIG. 8 shows a carriage 30 on a track (e.g., any of the above carriages on tracks) with internal floor plates 37 (shown in FIGS. 4C and 4E) removed exposing ejection actuation systems 110, 112. The ejection actuation systems 110, 112 may be engaged to selectively rotate the carrier body with respect to its base 80 to eject the content of the thus lower containment area. Each ejection actuation system may, for example, selectively cause rotation of the outer posts 111 relative the inner central post 113. FIG. 9 shows an exploded view of the carriage 30 and track base 80 that couples via a coupling member 83 to a belt 85 on the track 50. FIG. 10A shows the assembly with a drive roller 81 for moving the belt 85, which is attached to and moves the carriage 30. FIG. 10B shows a similar assembly with two belts 87 on drive rollers 89 for independently moving two carriages (e.g., 102, 104 in the system of FIGS. 7A-7D). Again, each belt 87 is attached to and independently moves with one of the carriages 102, 104. Each of the carriages discussed herein may be similarly controlled in their movement. In accordance with further aspects, other types of drive systems may be employed, including pneumatic, electric, chain (for linear or non-linear movement), as well as screw drives and ball screw drives (for linear movement).

In accordance with various aspects therefore, object processing systems are provided each of which may include an input area including a loading station, a distribution area including a plurality of destination locations, a carrier body including a plurality of containment areas for respectively receiving a plurality of objects at the loading station, a motion actuator for moving the carrier body from the loading station to the distribution area, and an ejection actuation system for actuating the carrier body to deposit each of the plurality of objects into different of the plurality of the destination locations.

Figure 11:
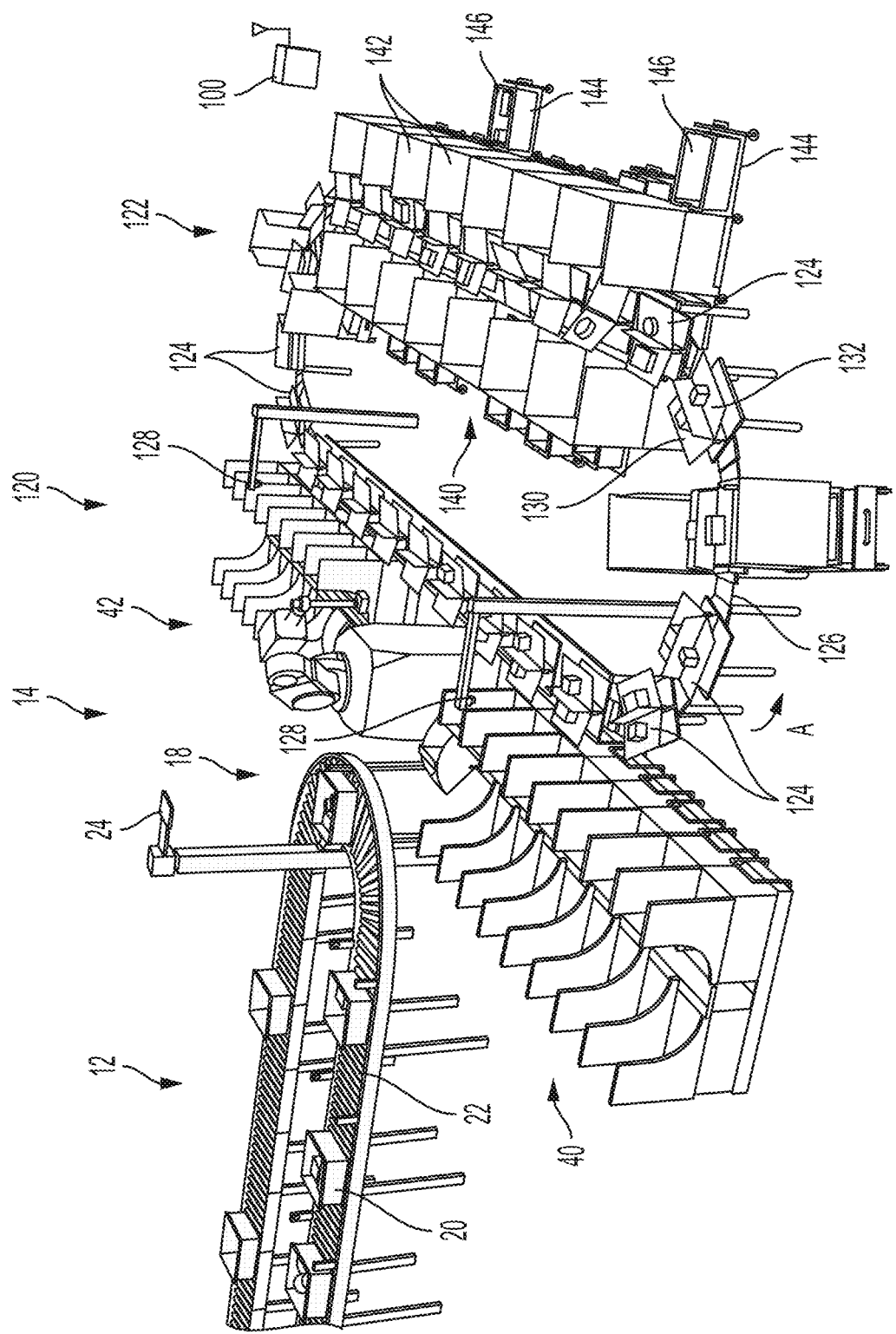
FIG. 11 shows an illustrative diagrammatic view of an object processing system including a carrier system in accordance with an aspect of the present invention including a portion that moves carriers in non-linear motion.

FIG. 11 shows an object processing system 120 in accordance with a further aspect of the present invention that includes a carrier system 122 that provides non-linear movement of carriers 124, each of which includes a first side 130 and a second side 132. The system 120 includes an input area 12, an object processing area 14, and distribution areas 42, 122. The input area 12 includes a loading station 18 proximate the object processing area 14, where objects are presented in bins 20 on an input conveyor 22. Using perception data from a perception system 24, a programmable motion device (e.g., a robot) 26 moves objects to any of a variety of carrier systems including the carriers 124. The carriers 124 move along a track 126 in a direction as indicated at A and are actuated to tip in either of two opposing directions when above a destination location 142. Each destination location includes a set of bins 146 on drawers 144. Each drawer, for example, may include four bins, two of which at a time may be positioned to receive objects from the carriers 124. The destination locations 142 may be provided along a linear section or a non-linear section of the track, and certain of the destination locations 142 may include guide walls to facilitate dropping an object while the carriers are moving. Again, operation of the system may be controlled by one or more computer processing systems 100.

Figure 12:
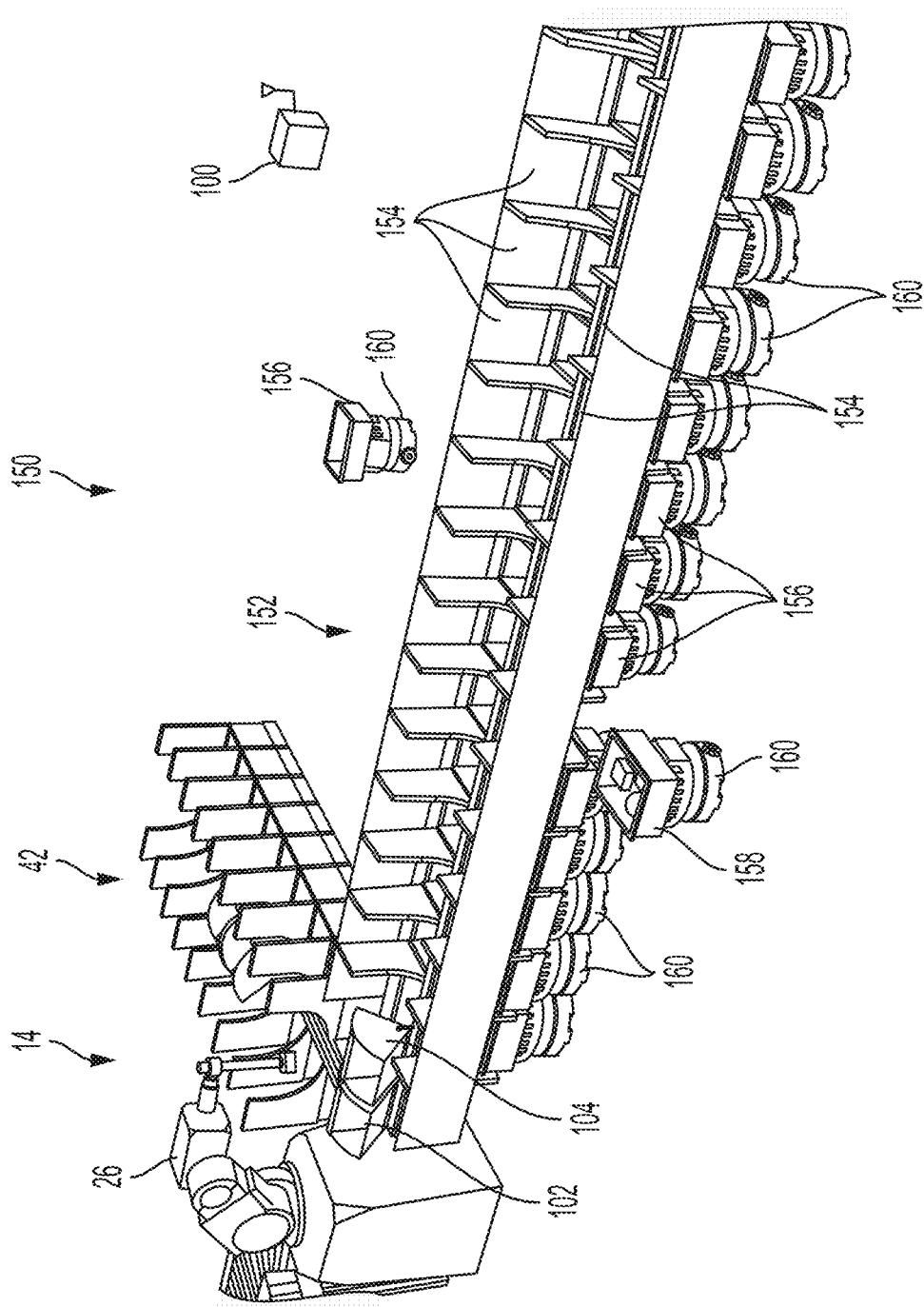
FIG. 12 shows an illustrative diagrammatic view of an object processing system including a carrier system in accordance with another aspect of the present invention that includes destination locations that are provided on automated mobile devices.

In accordance with further aspects, the invention provides an object processing system 150 that includes a distribution area 152 that includes destination locations 154, each of which includes a bin 156 on an automated mobile device 160 as shown in FIG. 12. The system 150 includes an input area 12, an object processing area 14, and distribution areas 42, 152. The input area 12 includes a loading station 18 proximate the object processing area 14, where objects are presented in bins 20 on an input conveyor 22. Using perception data from a perception system 24, a programmable motion device (e.g., a robot) 26 moves objects to any of a variety of carrier systems 42, 152 including the carriages 102, 104. When a bin (e.g., bin 158) is full or otherwise completed, the completed bin 158 is driven away on the automated mobile device 160 for further processing. Again, operation of the system may be controlled by one or more computer processing systems 100.

Figure 13A:
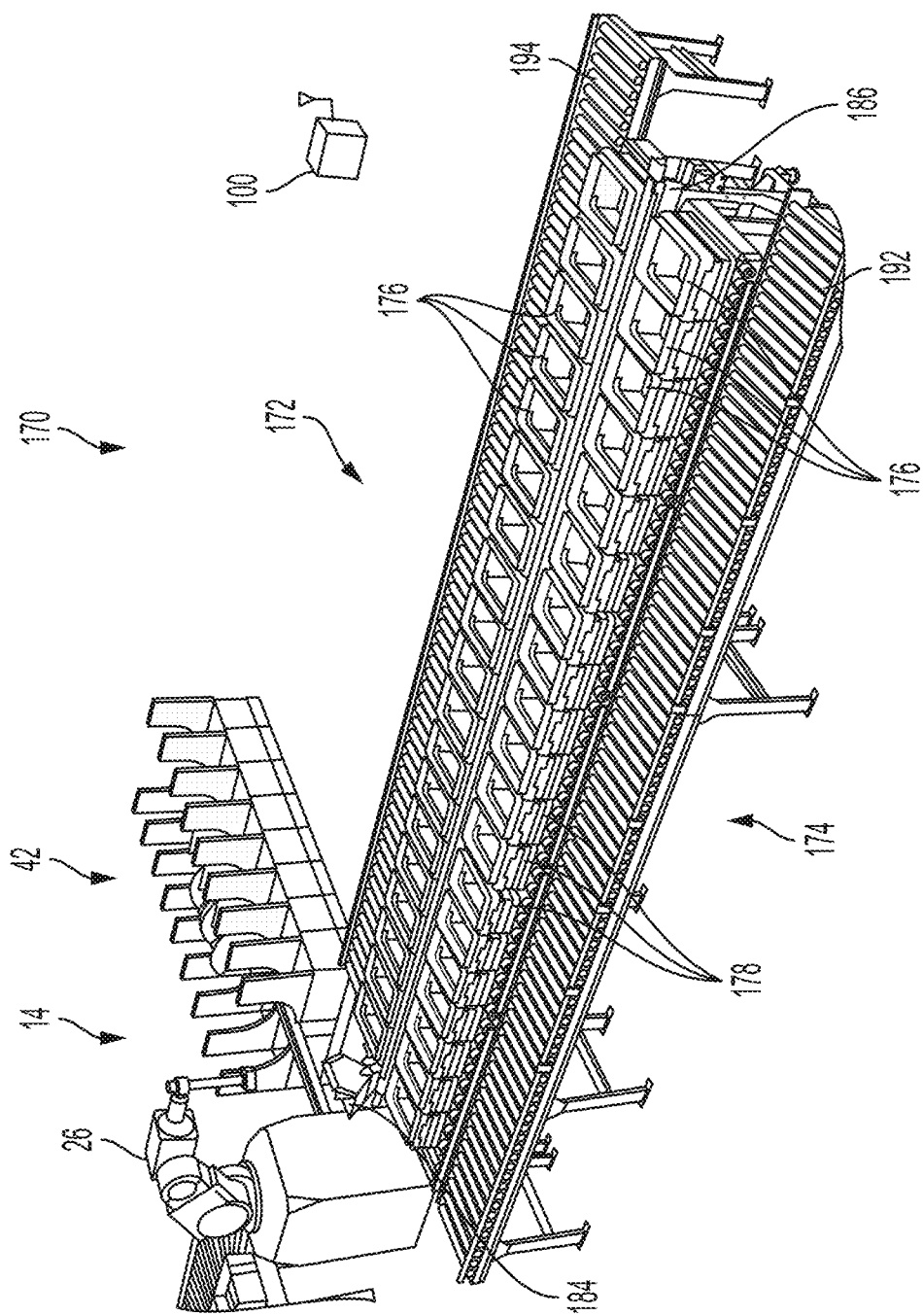
FIGS. 13A and 13B show illustrative diagrammatic views of an object processing system in accordance with a further aspect of the present invention that includes displaceable bins at destination locations, showing the bins ready to receive objects (FIG. 13A) and showing one bin being displaced onto an outfeed conveyor.
Figure 13B:
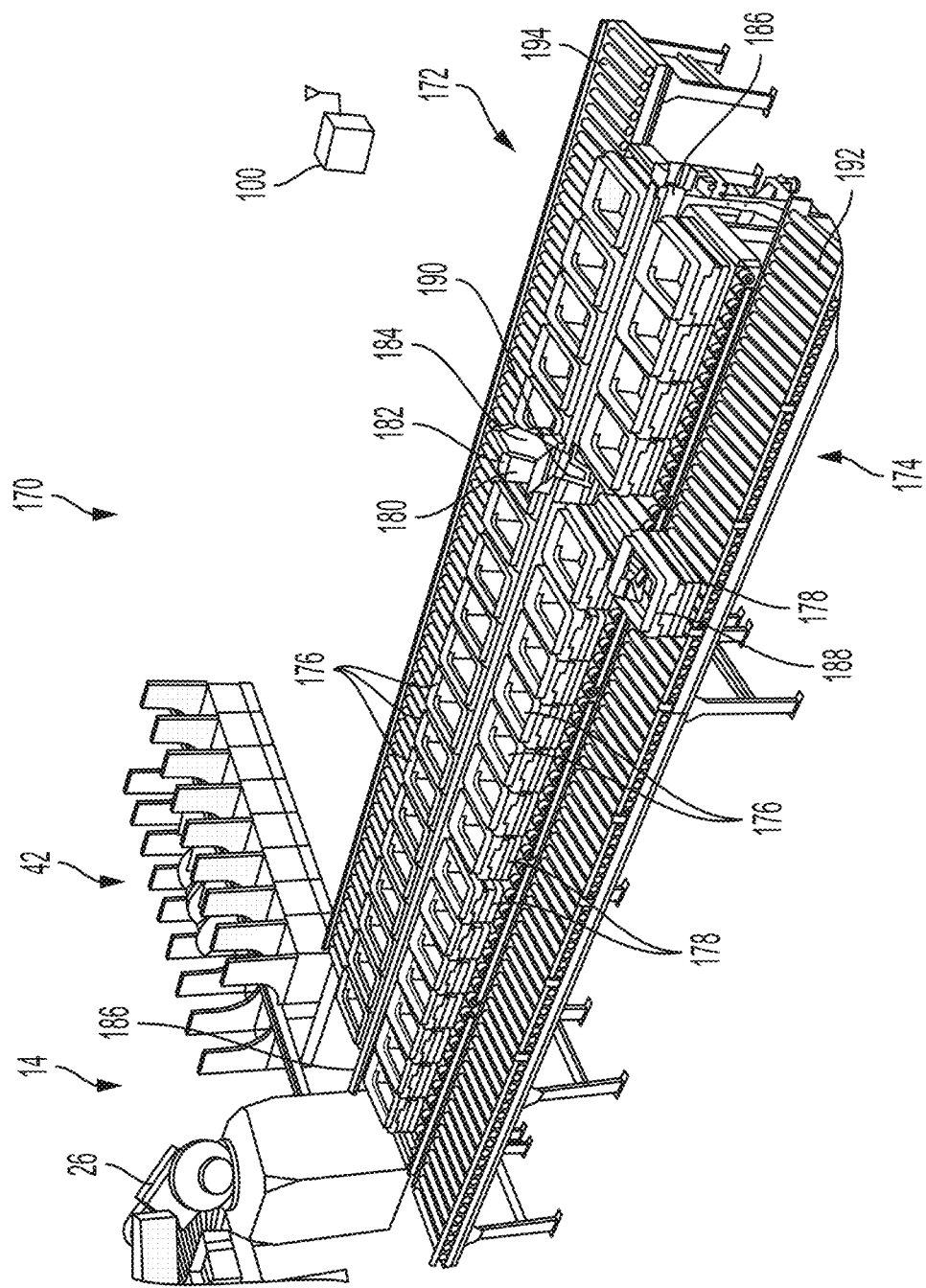

In accordance with further aspects, the invention provides an object processing system 170 that includes two rows 172, 174 of destination location bins 176 that may be provided on box tray assemblies 178. The system 170 includes an input area 12, an object processing area 14, and distribution areas 42, 172. The input area 12 includes a loading station 18 proximate the object processing area 14, where objects are presented in bins 20 on an input conveyor 22. Using perception data from a perception system 24, a programmable motion device (e.g., a robot) 26 moves objects to any of a variety of carrier systems 42, 172 including a dual containment area carrier 184. The destination locations bins 176 are accessed by the dual containment area carrier 184 that runs along a track 186 as shown in FIG. 13A. As shown in FIG. 13B, when a destination location bin is full or otherwise finished being processed, a box kicker 190 that runs along with the carrier 184 is actuated, causing the completed bin 188 to be moved to one of the outer out-feed conveyors 192, 194. Again, operation of the system may be controlled by one or more computer processing systems 100.

Figure 14:
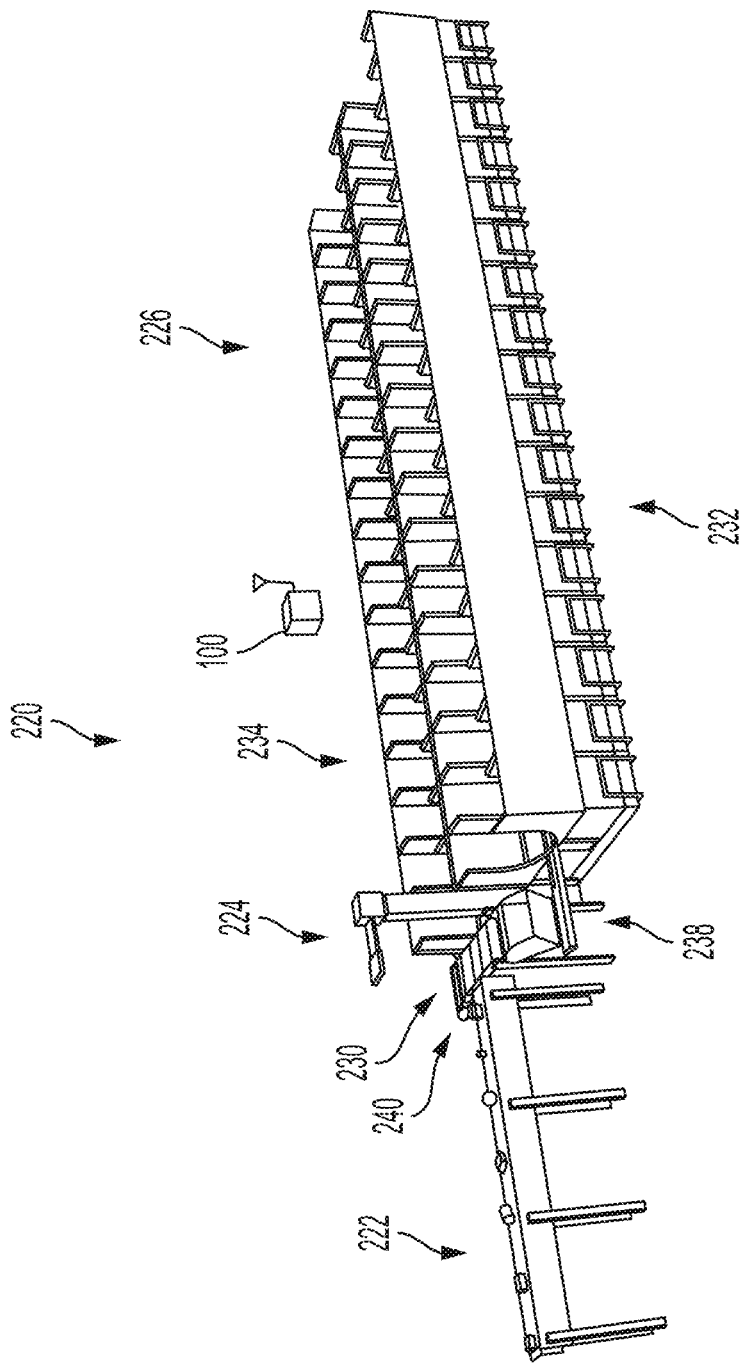
FIG. 14 shows an illustrative diagrammatic view of an object processing system in accordance with a further aspect of the present invention that includes a conveyor in-feed distribution system.
Figure 15:
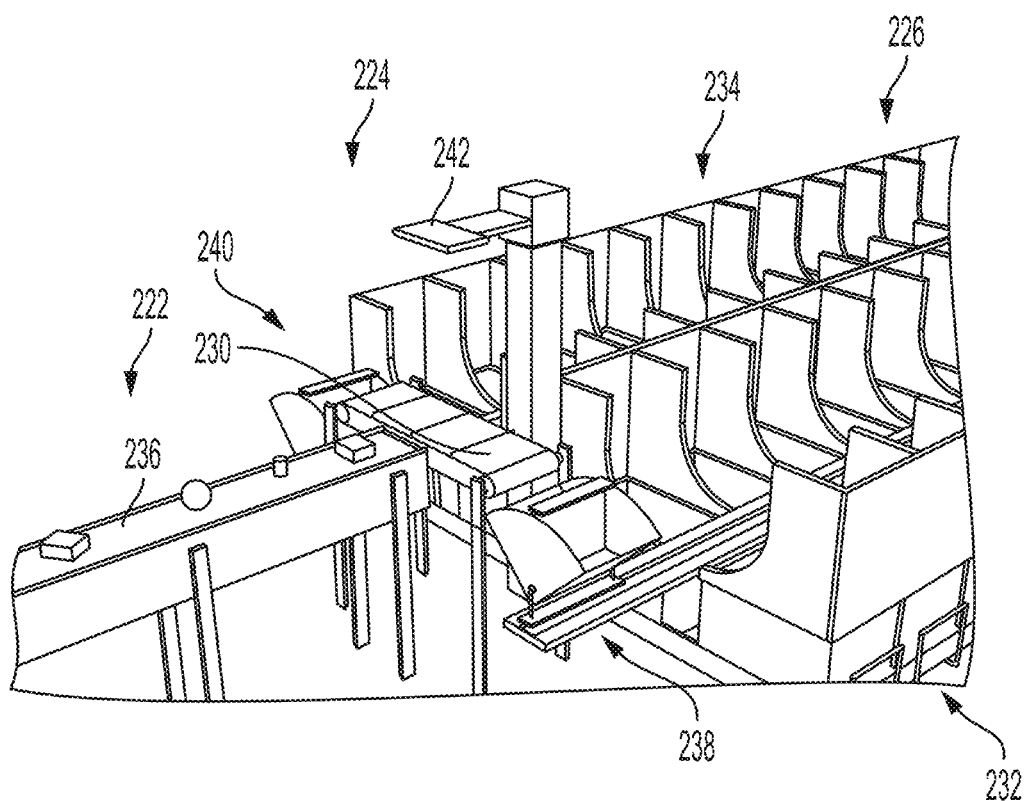
FIG. 15 shows an illustrative diagrammatic enlarged view of the conveyor in-feed distribution system of FIG. 14.
Figure 16:
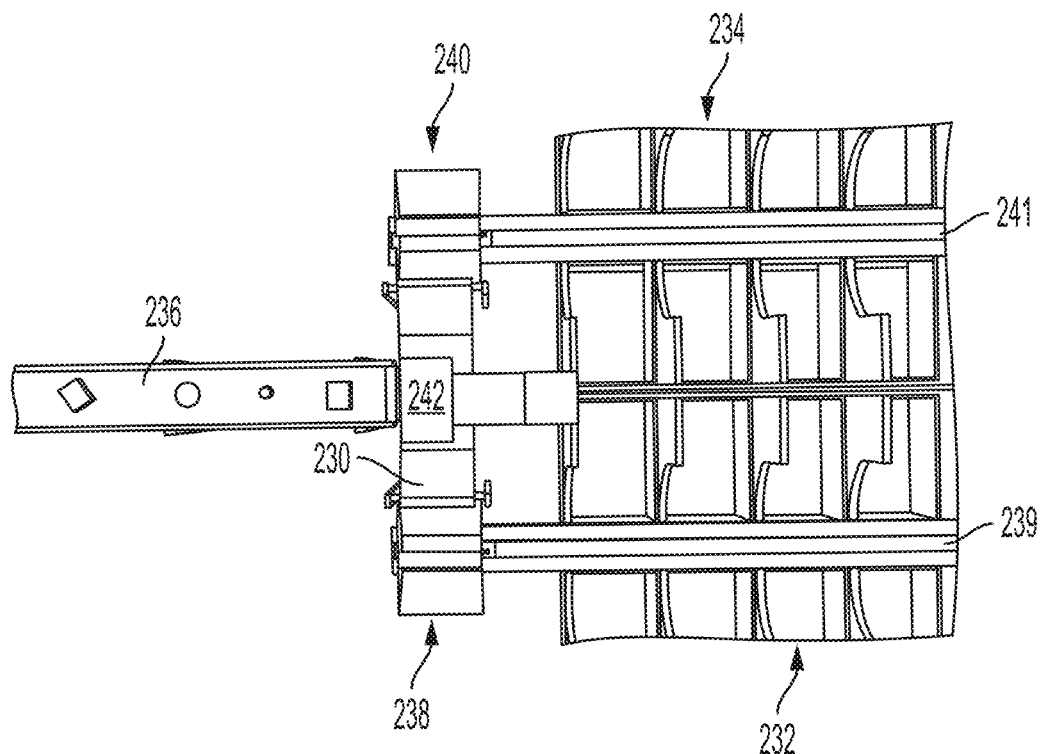
FIG. 16 shows an illustrative diagrammatic plan view of the conveyor in-feed distribution system of FIG. 15.

In accordance with further aspects, a divided carrier may be loaded from a conveyor (as opposed to a robot directly placing objects into containment areas) such as a belted conveyor (e.g., cleated or non-cleated) or a roller conveyor. FIG. 14, for example, shows an object processing system 220 that includes an input area 222, an object processing area 224, and a distribution area 226. The input area 222 leads to a loading station 228 of the object processing area 224, and the object processing area 224 includes a loading conveyor 230 that alternately leads to either of two shuttle wings 232, 234. With further reference to FIGS. 15 and 16 (which show side elevational and top views), the loading conveyor 230 receives objects from an input conveyor 236, and moves them to either of carrier systems 238, 240 of one or the other of the shuttle wings 232, 234 based on perception data from the perception unit 242. The operation of the system may be controlled by one or more computer processing systems 100 in communication with the input conveyor 236, the loading conveyor 230, the perception system 242 and the carrier systems 238, 240.

Figure 17A:
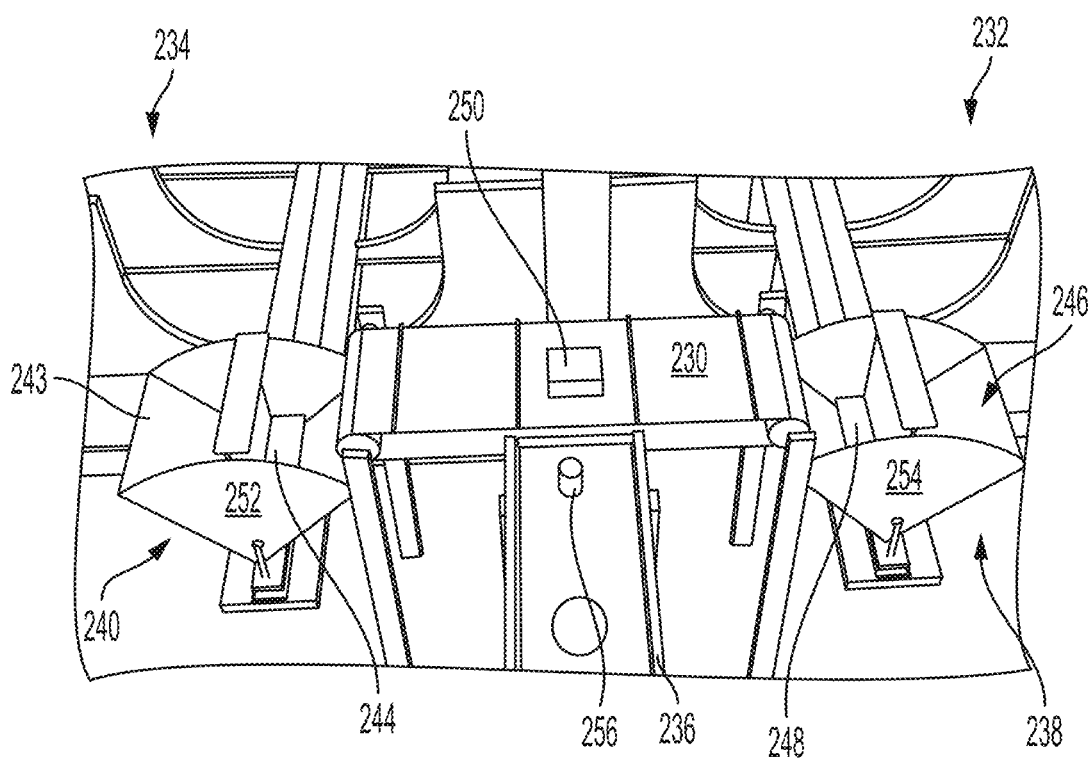
FIGS. 17A-17F show illustrative diagrammatic enlarged views of the conveyor in-feed distribution system of FIG. 15, showing a stream of objects being received (FIG. 17A), a first object being loaded onto a first portion of a first carrier (FIG. 17B), showing a second object being loaded onto a first portion of a second carrier (FIG. 17C), showing a third object being loaded onto a second portion of the first carrier (FIG. 17D), showing a fourth object being loaded onto a second portion of the second carrier (FIG. 17E), and showing the first and second carriers being moved toward destination locations (FIG. 17F)
Figure 17B:
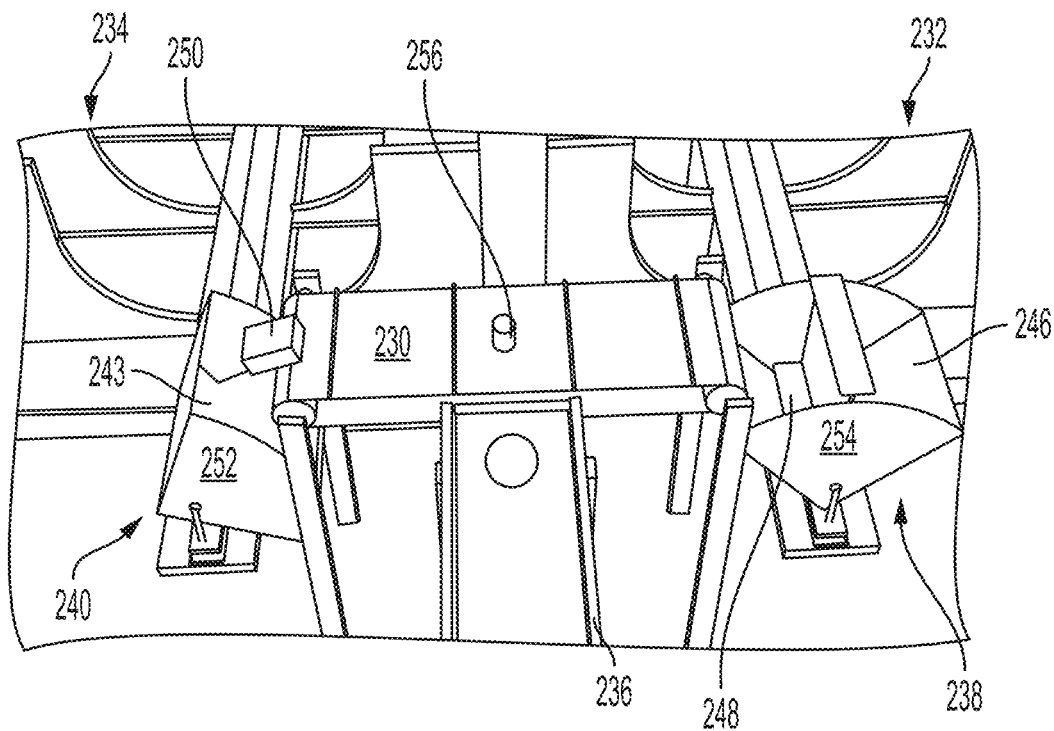
Figure 17C:
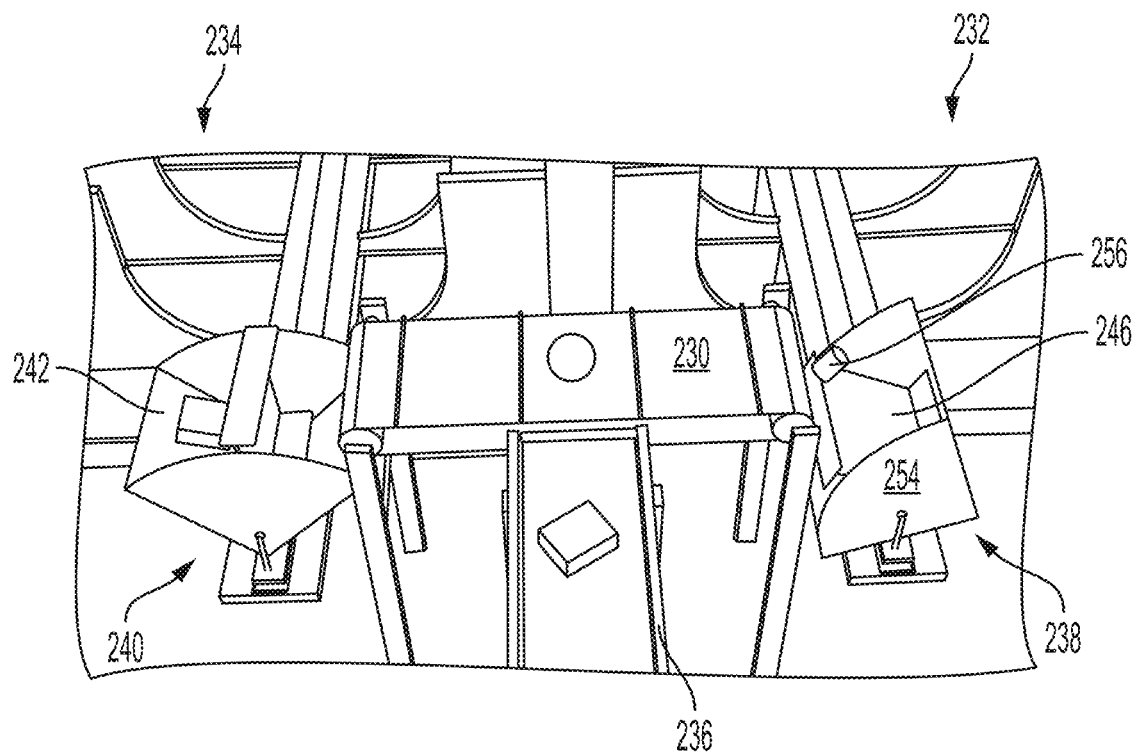
Figure 17D:
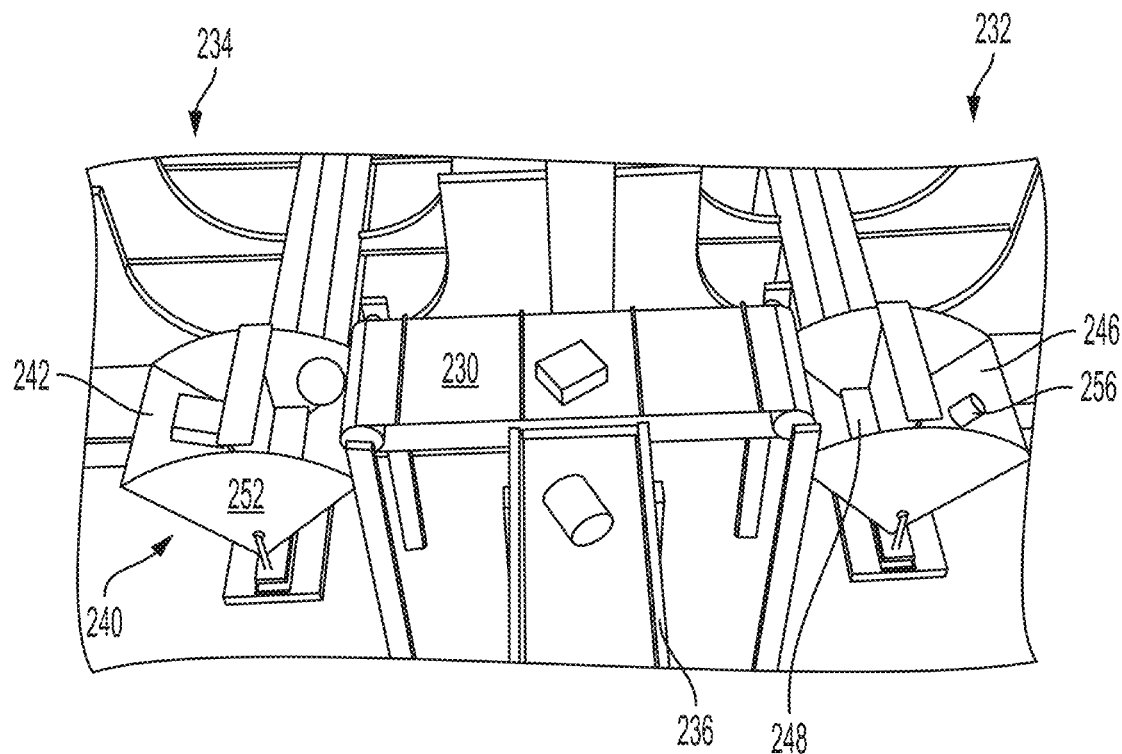
Figure 17E:
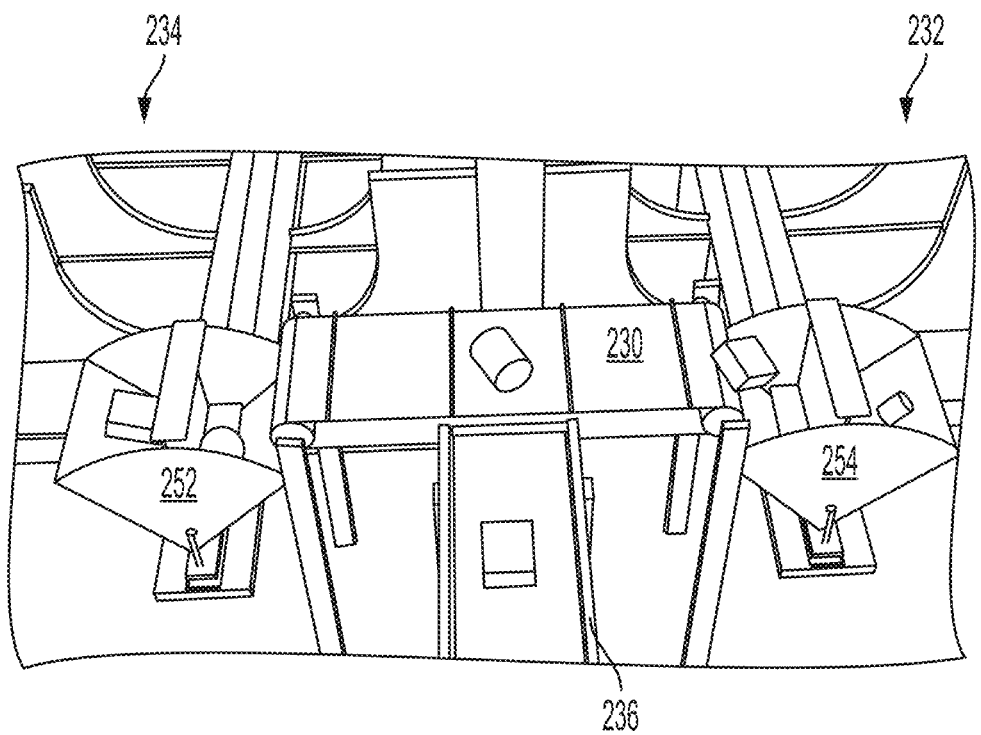
Figure 17F:
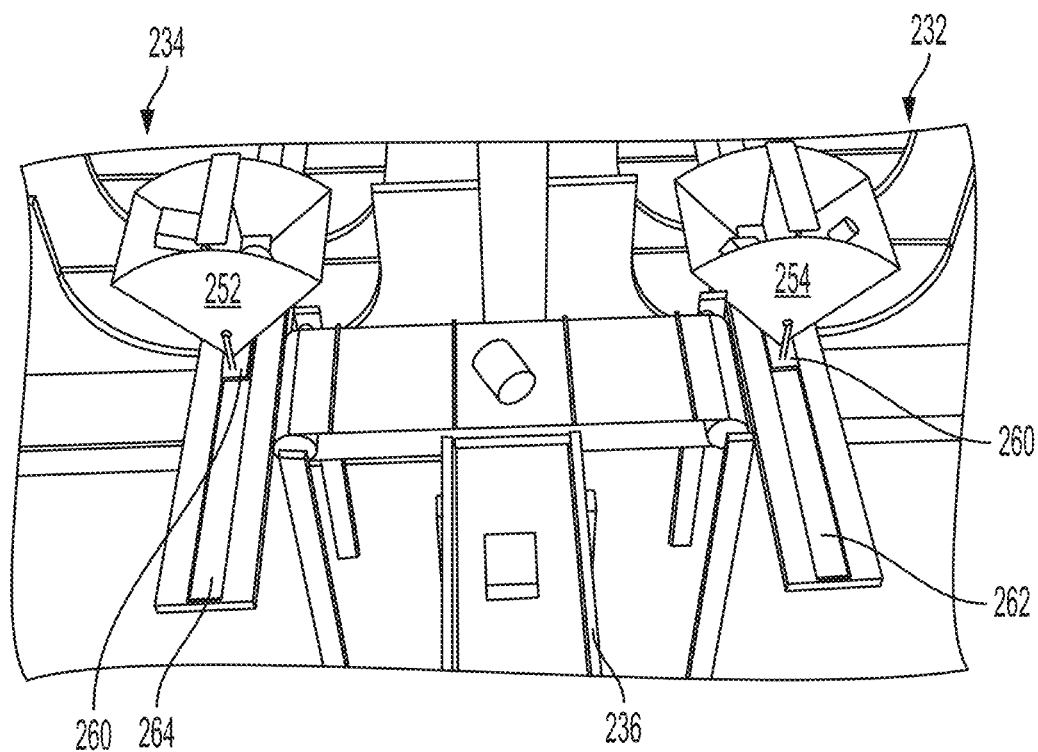

In particular, with reference to FIG. 17A, an object 250 may be received by the loading conveyor 230 and may be moved in a direction generally transverse to the direction of the input conveyor 236, e.g., to the carrier system 240. The carrier body 252 may be rotated (e.g., to an ejection position) such that the object 250 may drop into an outer containment area 243 of the divided carrier body 252 as shown in FIG. 17B. Similarly, the carrier body 254 of the carrier system 238 may be rotated (as shown in FIG. 17C) to receive an object 256 in an outer containment area 246 of the divided carrier body 254. The carrier bodies are righted, and the inner containment area 244 of the divided carrier body 252 may then receive an object from the loading conveyor 230 (as shown in FIG. 17D), and the inner containment area 248 of the divided carrier body 254 may receive an object from the loading conveyor 230 (as shown in FIG. 17E). With reference to FIG. 17F, the carrier systems 238, 240 are then actuated to move the carrier bodies 252, 154 among the distribution locations of the shuttle wings 232, 234. In particular, the objects may be deposited from the divided carrier bodies 252, 254 into the distribution locations using the ejection actuation system discussed above with reference to FIGS. 4A-4F, using the actuation system of FIG. 8 with the retention top plate serving to retain an object not being deposited while the carrier body is rotated.

In accordance with various aspects, the system may dynamically determine whether to load objects into each available containment area, or instead whether to directly provide one or more objects to their destination locations, for example, if the system knows that a next similarly processable object may not be soon presented at the loading station (e.g., 18, 228). The carrier systems of FIGS. 14-17F may be any of the carrier systems as discussed above including those with reference to FIGS. 1-10B. The use of carrier systems of the invention permit an increase in the throughput of the shuttle or gantry crane subsystem, for example, by increasing the number of objects carried by the carrier system.

Figure 18:
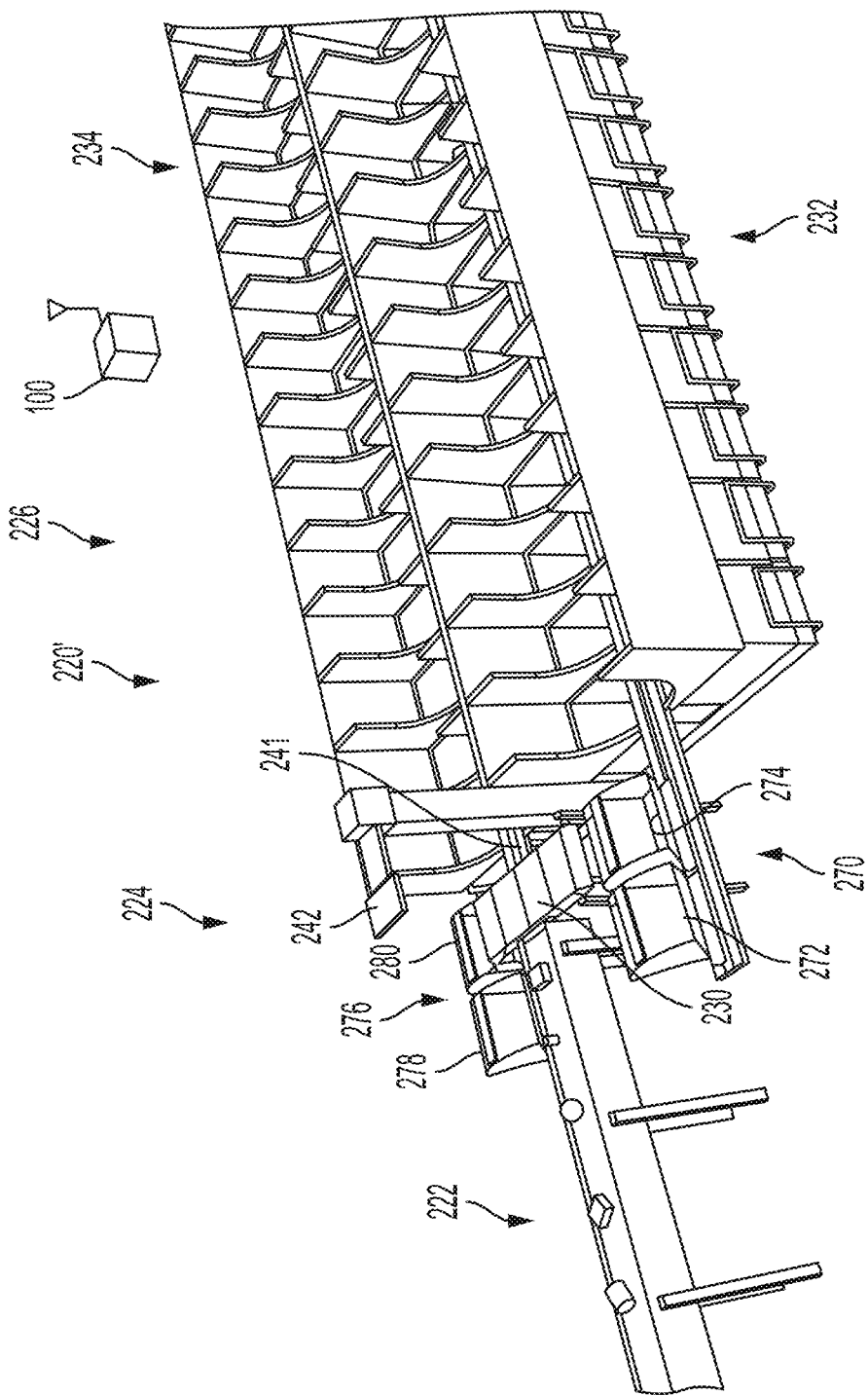
FIG. 18 shows an illustrative diagrammatic view of an object processing system in accordance with a further aspect of the present invention that includes a conveyor in-feed distribution system and carrier system that includes four carrier units.

FIG. 18, for example, shows an object processing system 220' that similarly includes an input area 222, an object processing area 224, and a distribution area 226. The object processing area 224 includes a loading conveyor 230 as discussed above, but the carrier systems 270, 276 to which the loading conveyor 230 leads on either side, is comprised of, for example, a double carriage each of which is divided, such as, for example, carrier systems 34 or 36 in FIGS. 1-3 and 6A-10B, providing independent linear motion and/or ejection actuation. In the system of FIG. 18, the outer containment area of a first carriage 280 of the carrier system 276 and the outer containment area of the first carriage 274 of the carrier system 270 are first loaded as discussed above (by rotating the carriages 280, 274), and the inner containment areas of the carriages 180, 174 are loaded as discussed above. The carrier systems 270, 276 are then moved linearly along the respective tracks 239, 241 such that the carriages 278, 272 are aligned with the loading conveyor 230. The outer containment area of a second carriage 278 of the carrier system 276 and the outer containment area of the second carriage 272 of the carrier system 270 are then loaded as discussed above (by rotating the carriages 278, 272), and the inner containment areas of the carriages 278, 272 are loaded as also discussed above. If the carriages do not include dividing walls (such as carrier system 32 shown in FIGS. 5A, 5B, the carriages may be loaded without rotating). The carrier systems 270, 276 may then provide the objects therein to any of the distribution locations in the shuttle wings 232, 234 as discussed above including those with reference to FIGS. 1-3 and 6A-10B. Any of the output systems such as shown in FIGS. 11, 12, 13A, 13B may be used with any of the carrier systems disclosed above with reference to FIGS. 1-10B and 14-18.

Figure 19:
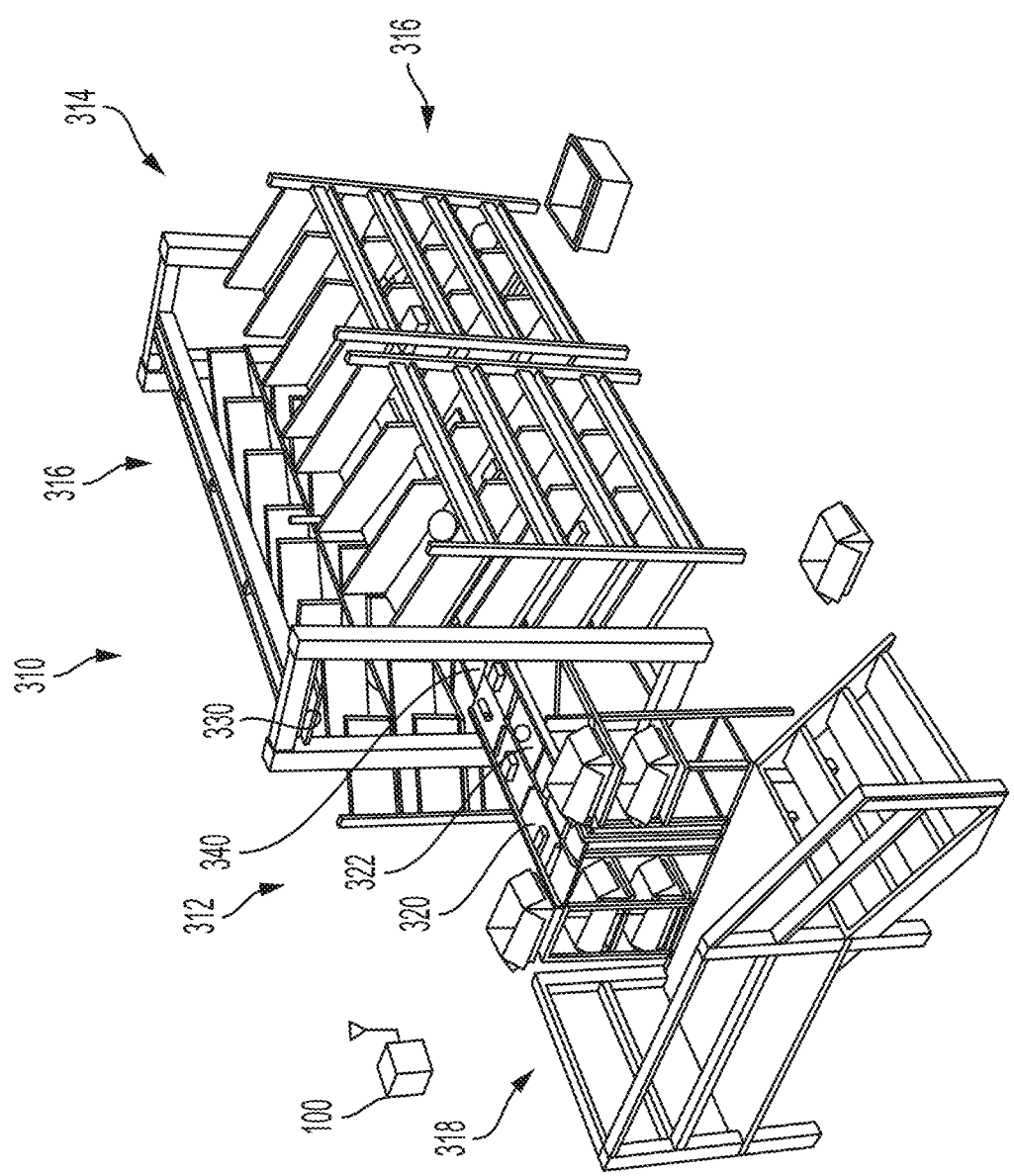
FIG. 19 shows an illustrative diagrammatic view of an object processing system in accordance with an aspect that includes a carrier system of a further aspect of the present invention that provides carrier movement in horizontal and vertical directions.

In accordance with further aspects of the carrier systems of the present invention may be used with a put wall object processing system as shown at 310 in FIG. 19. The system 310 includes an input area 312, a processing area 314 and one or two distribution areas 316. The input area may provide that objects are provided to one or more input conveyors 320, 322 by human personnel at a manual work-station 318 (e.g., as shown in FIG. 19) or objects may be provided to one or more input conveyors 320, 322 by a programmable motion device at an automated work-station 318' that receives objects on a feed conveyor (e.g., as shown in FIG. 20).

The system 310 in FIG. 19 includes the manual work-station 318 at which human personnel pick objects from boxes and place the objects onto one or two input conveyors 320, 322. A perception system 330 monitors the objects on the conveyors 320, 322. A carrier system 340 (also shown in FIG. 21A) is provided within the processing area 214 between the distribution areas. The one or more computer processing systems 100 determines where on the carrier system (e.g., a transverse conveyor) the next two objects should be positioned for placement. For example, the two objects may remain on their respective left and right sides as presented by the input conveyors by simply receiving the objects on the transverse conveyor such as a belted conveyor (e.g., cleated or non-cleated) or a roller conveyor. Alternatively, the two objects may be reversed by loading one object first and then moving the transverse conveyor to move the object to the opposite side within the processing area 314 prior to receiving the next object. This is done, again using the one or more computer processing systems 100, to position the objects on the transverse conveyor at relative locations best suited for being deposited into destination locations with the distribution areas 316.

Figure 20:
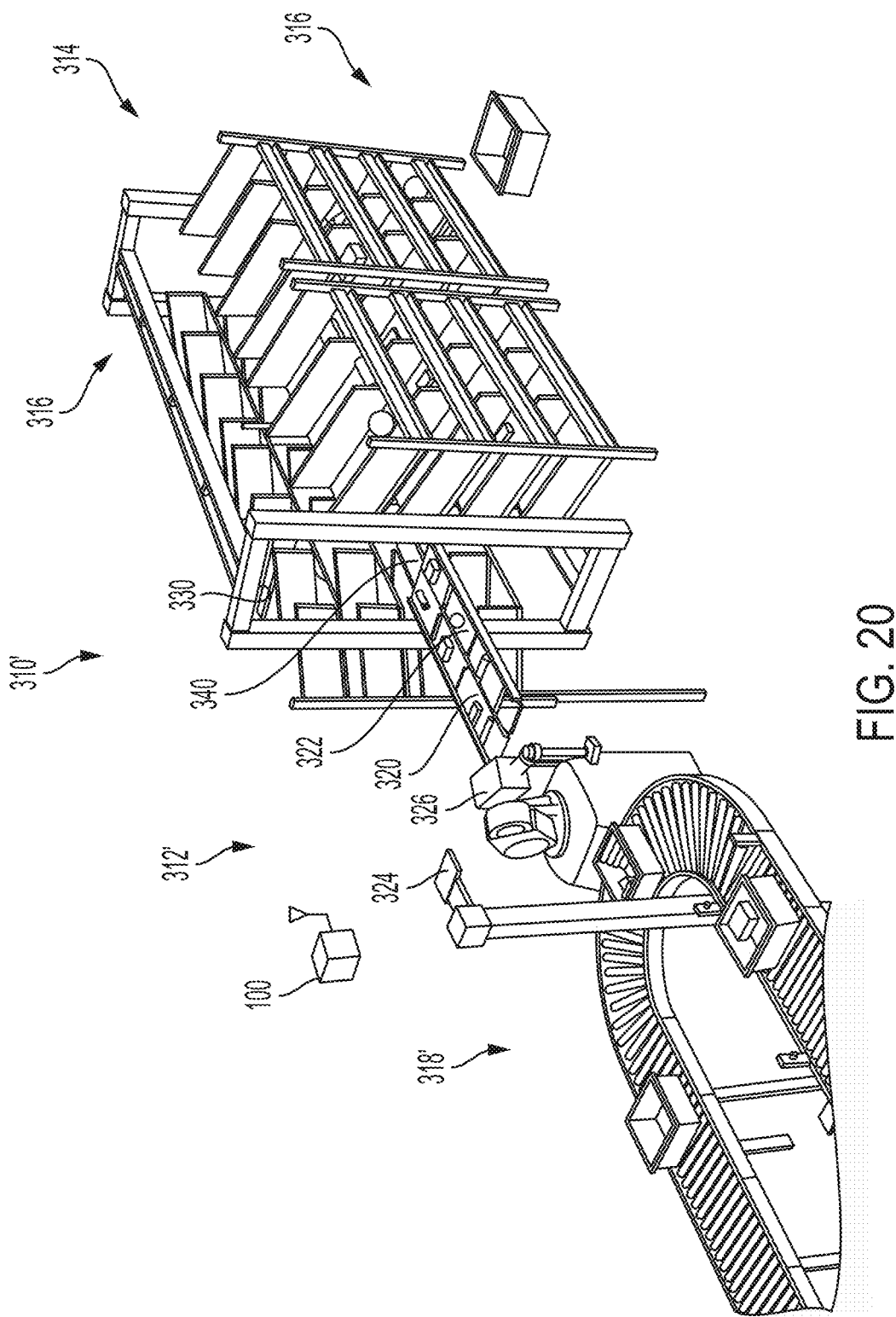
FIG. 20 shows an illustrative diagrammatic view of an object processing system in accordance with an aspect that includes a carrier system of a further aspect of the present invention that also provides carrier movement in horizontal and vertical directions, wherein the carrier system receives object from an automated in-feed system.
Figure 21A:
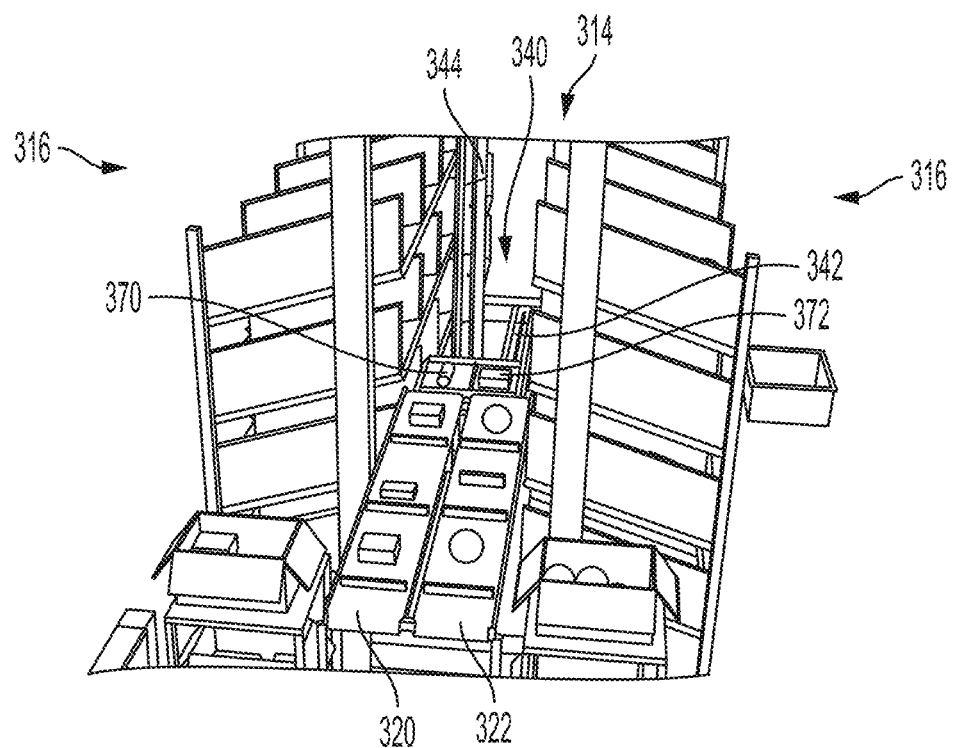
FIGS. 21A and 21B show illustrative diagrammatic end views of the carrier system of FIG. 20 showing the carrier in an object receiving position (FIG. 21A) and showing the carrier moving the objects to destination locations (FIG. 21B)

The system 310' in FIG. 20 includes the automated work-station 318' similar to the input area of FIGS. 1-3, in which perception data from a perception system 324 is used to control a programmable motion device 326 (e.g., a robot) to place the objects from bins on a source conveyor onto one or two input conveyors 320, 322. A perception system 330 monitors the objects on the conveyors 220, 222. A carrier system 240 (again, as also shown in FIG. 21A) is provided within the processing area 314 between the distribution areas. The one or more computer processing systems 100 determines where on the carrier system (e.g., a transverse conveyor) the next two objects should be positioned for placement. For example, the two objects may remain on their respective left and right sides as presented by the input conveyors (by simply receiving the objects on the transverse conveyor), or the two objects may be reversed by loading one object first and then moving the transverse conveyor to move the object to the opposite side within the processing area 314 prior to receiving the next object. This is done, again using the one or more computer processing systems 100, to position the objects on the transverse conveyor at relative locations best suited for being deposited into destination locations with the distribution areas 316.

Figure 22:
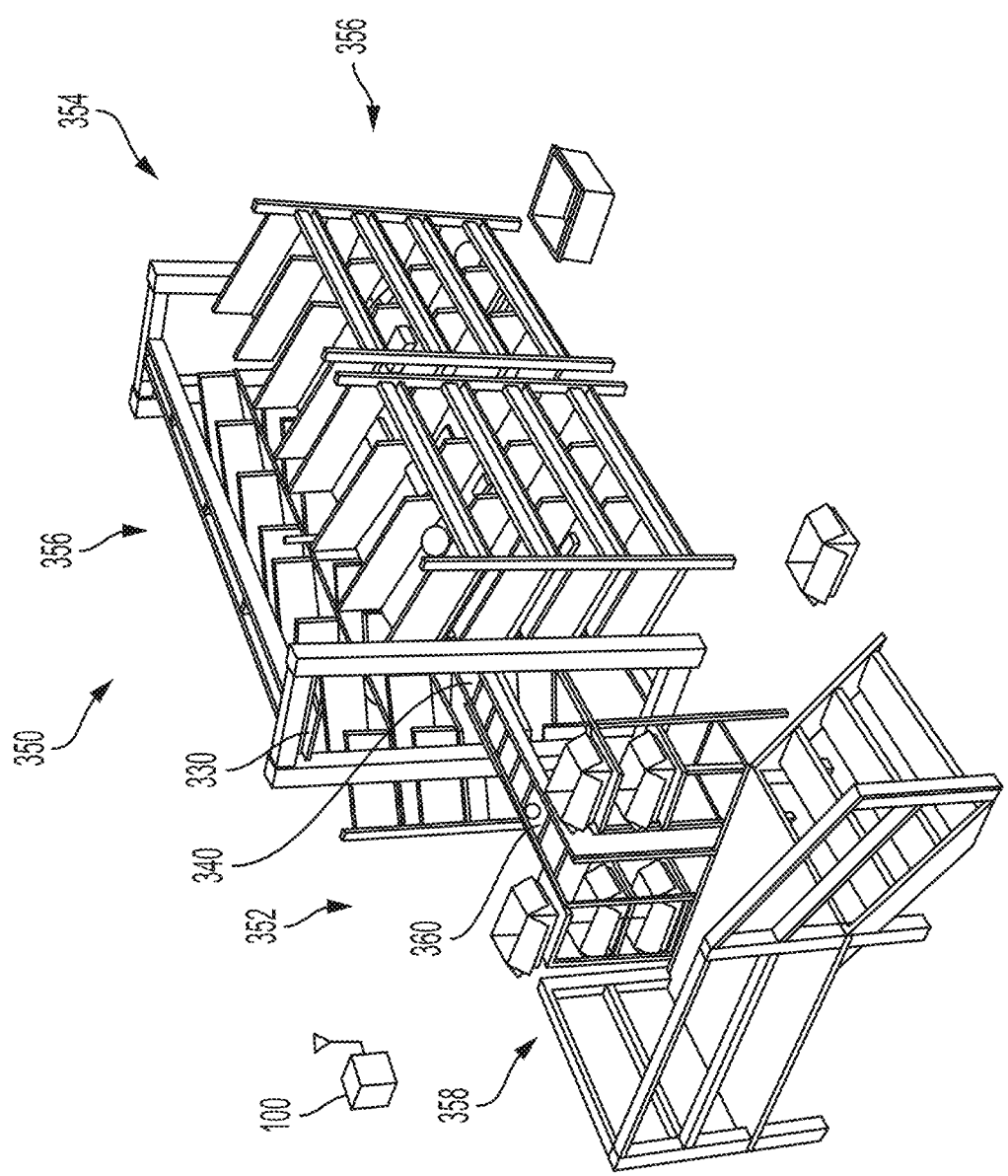
FIG. 22 shows an illustrative diagrammatic view of an object processing system in accordance with an aspect that includes a carrier system of a further aspect of the present invention that also provides carrier movement in horizontal and vertical directions, wherein the carrier system receives object from an in-feed system that includes at least one diverter.

In accordance with further aspects, the carrier system 340 may be loaded from a single input conveyor system. FIG. 22, for example, shows an object processing system 350 that includes an input area 352, a processing area 354 and one or two distribution areas 356. The input area 352 may provide that objects are provided to the input conveyor 360 by human personnel at a manual work-station 358 (e.g., as shown in FIG. 22) or objects may be provided to the input conveyor 360 by a programmable motion device at an automated work-station that receives objects on a feed conveyor (e.g., as shown in FIG. 20 and discussed above).

Figure 23A:
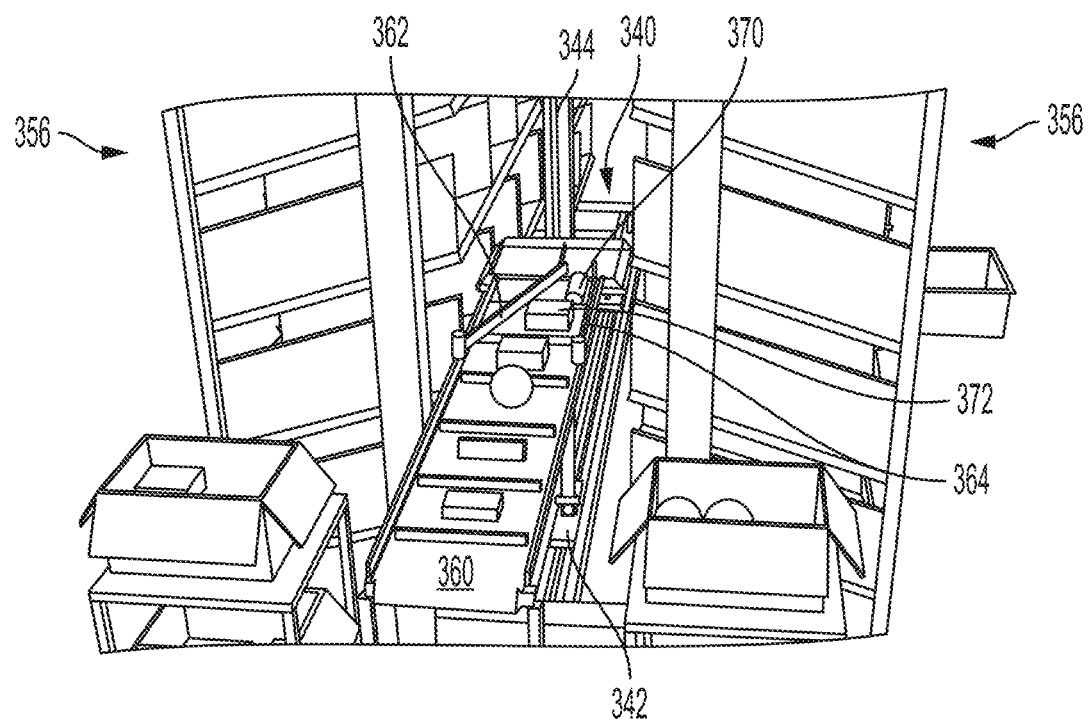
FIGS. 23A and 23B show illustrative diagrammatic end views of the in-feed system of FIG. 22, showing a first object being positioned on the carrier system (FIG. 23A) and showing a second object being positioned on the carrier system (FIG. 23B)
Figure 23B:
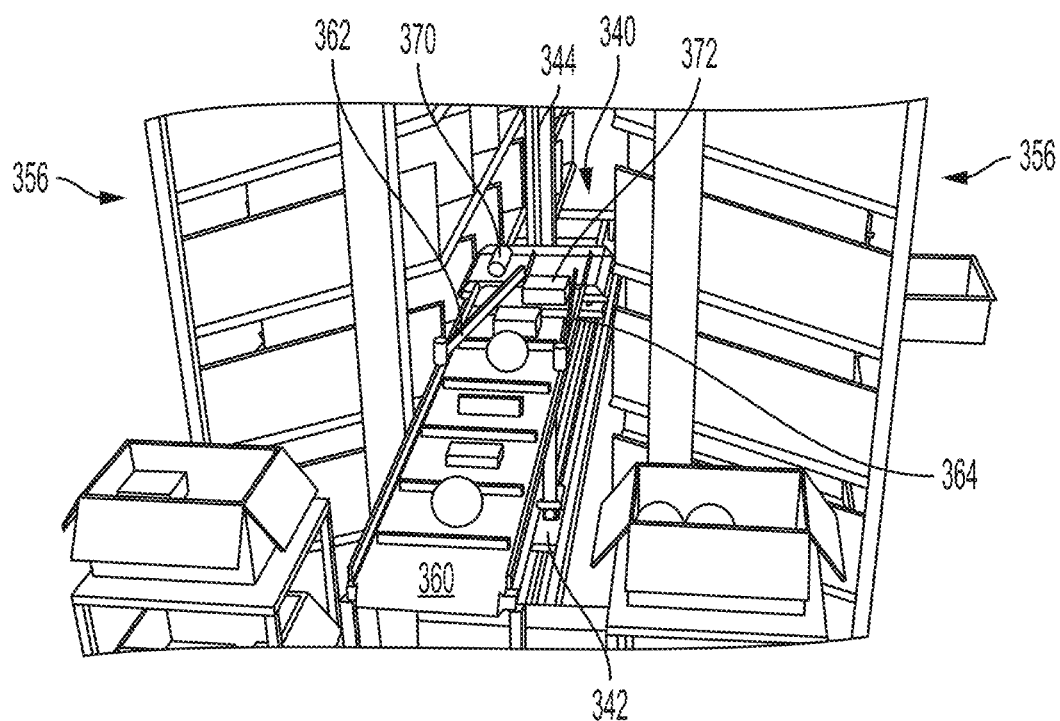

The input conveyor 360 may include rotatably actuatable guides 362, 364 that may be actuated (e.g., based on perception data provided by the perception system 330), to guide objects on the input conveyor 360 to one side or another side of the carrier system 340. In further aspects, the guides 362, 364 may be spring-biased to a closed position by a force that is overcome by an object being moved between the guides. FIG. 23A for example, shows a first object 370 being guided onto the carrier system 340, and with reference to FIG. 23B, the carrier system 340 then moves the object laterally and a next object 372 is then loaded onto the carrier system 340 as shown in FIG. 23B.

Figure 21B:
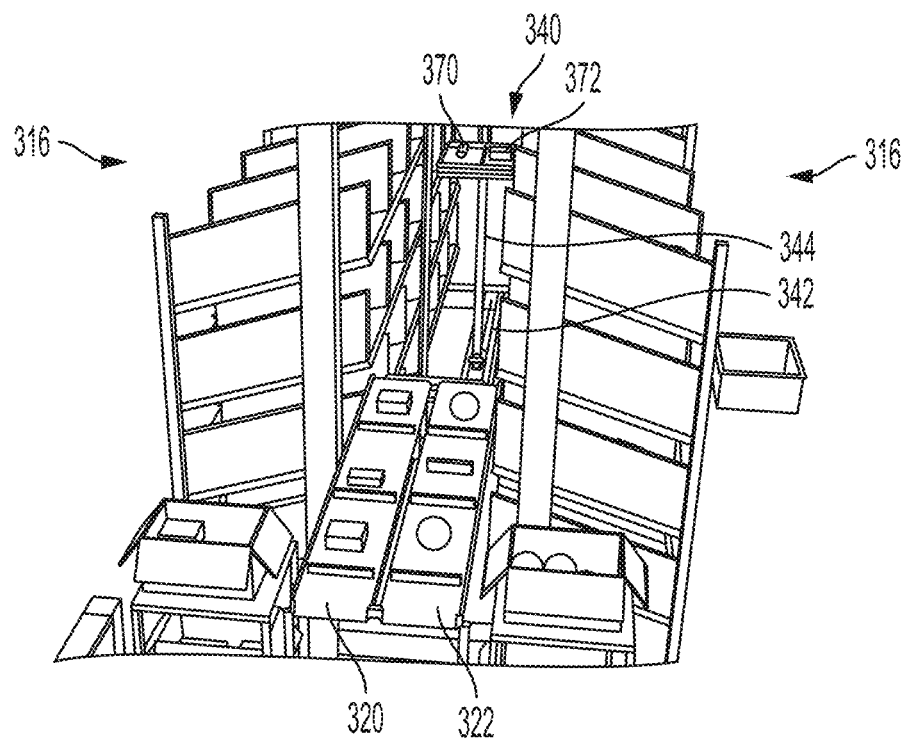
Figure 24A:
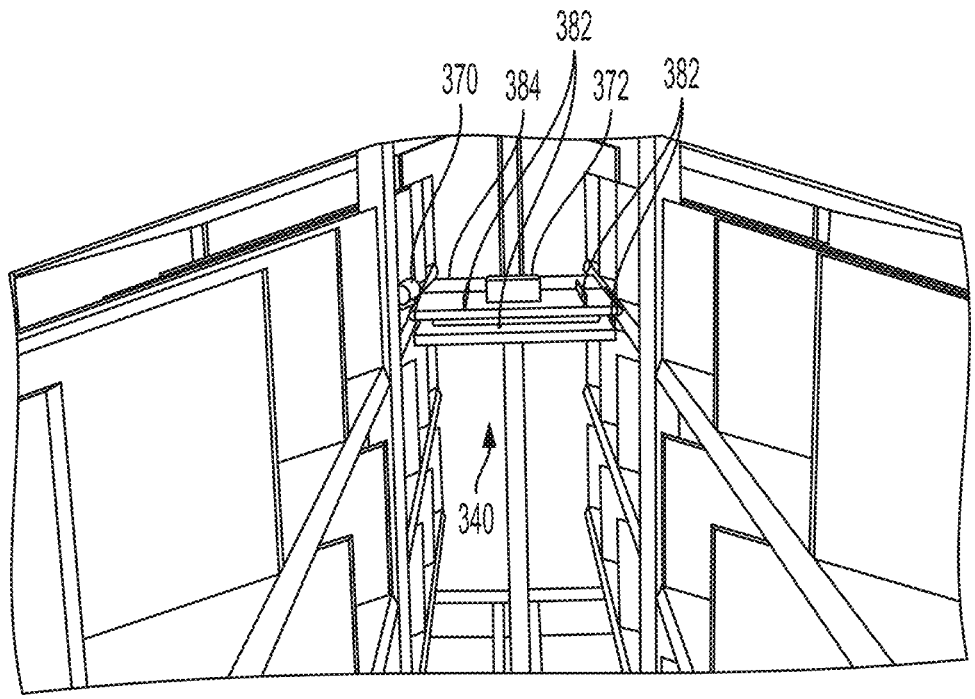
FIGS. 24A and 24B show illustrative diagrammatic end views of the carrier system of FIG. 22 showing the carrier in a first position delivering a first object to a first destination location (FIG. 24A) and showing the carrier in a second position delivering a second object to a second destination location (FIG. 24B)
Figure 24B:
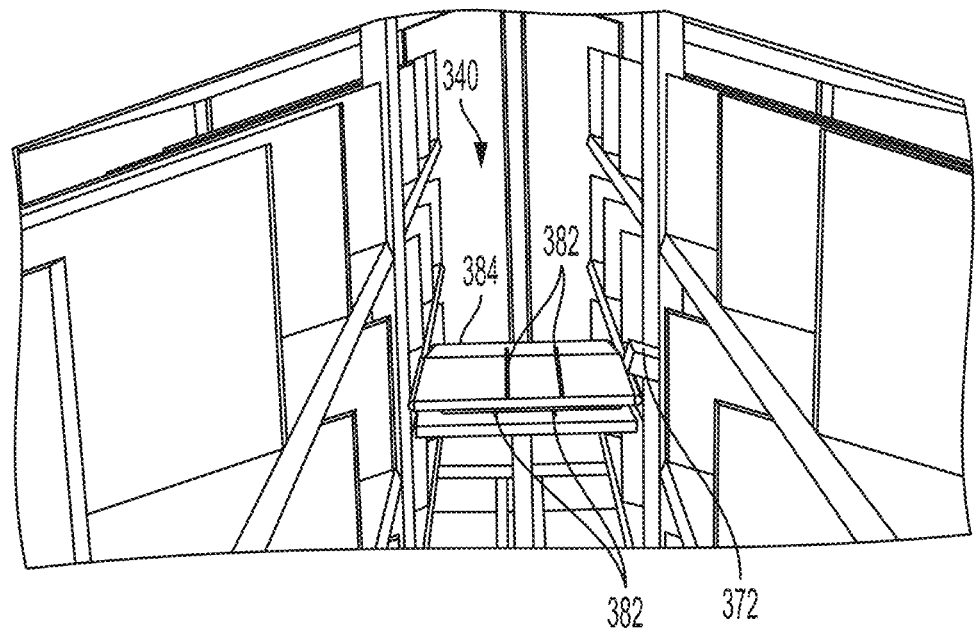
Figure 25A:
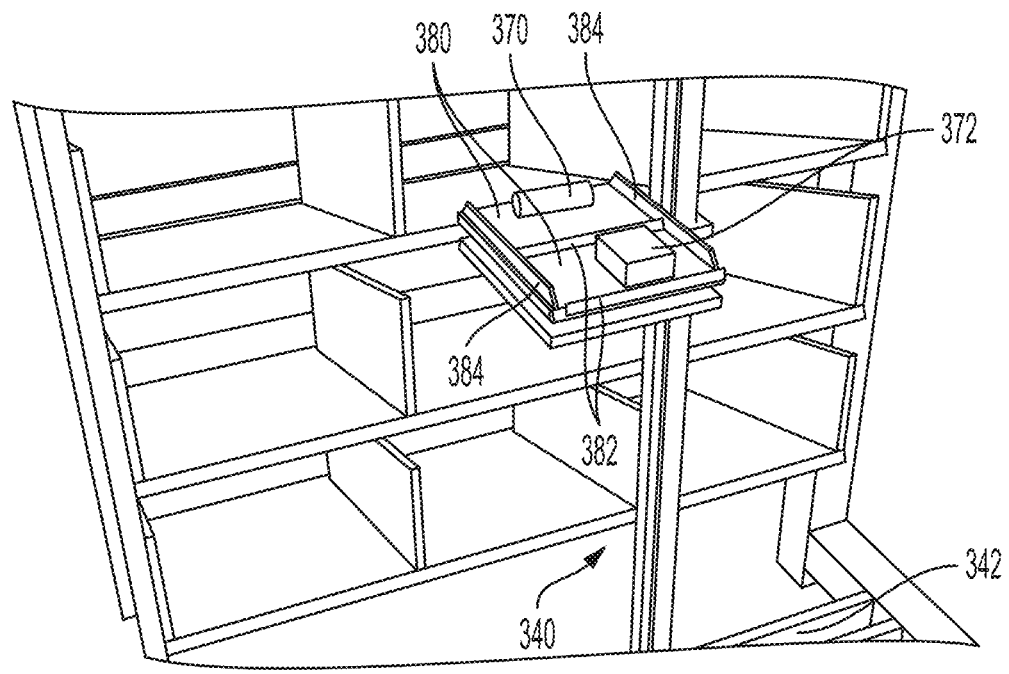
FIGS. 25A and 25B show illustrative diagrammatic end views of the carrier system of FIG. 22 showing the carrier in a first position delivering a first object to a first destination location (FIG. 25A) and showing the carrier in a second position delivering a second object to a second destination location on a same side as the first destination location (FIG. 25B)
Figure 25B:
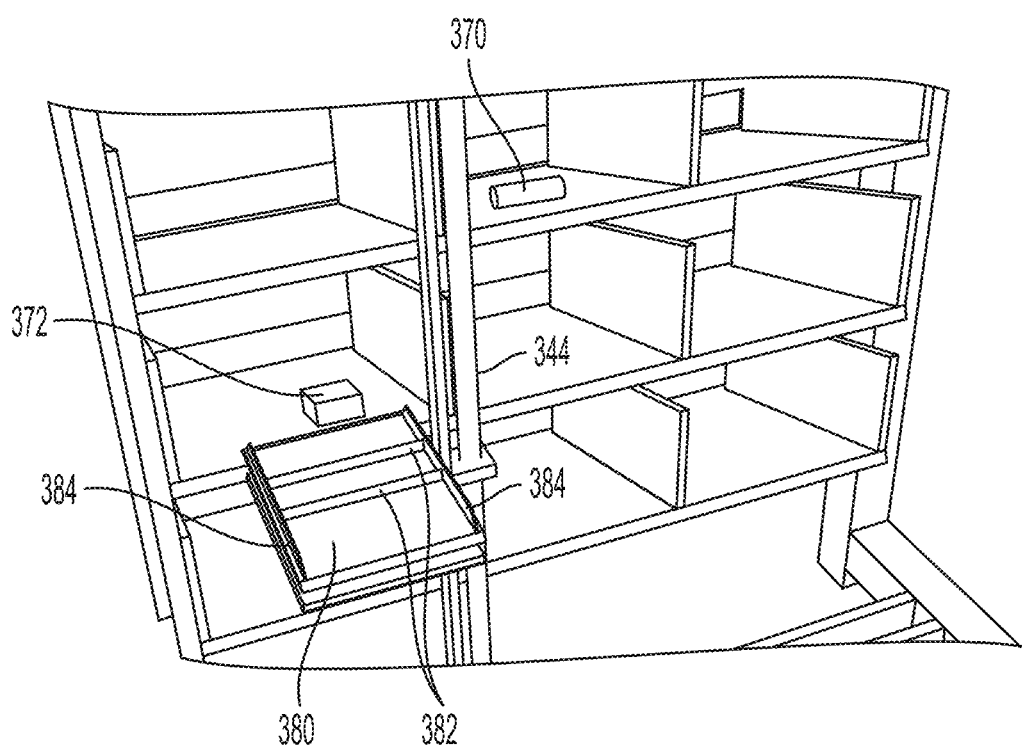

The objects 370, 372 are therefore loaded onto the carrier system 340 in any of a variety of ways as discussed above. The carrier system 340 includes a conveyor 380 that runs bi-directionally in directions that are generally transverse to a direction of movement of the input conveyors 320, 322 as shown in FIGS. 21A and 21B. The conveyor 380 includes cleats 382 as well as retaining walls 384 (only the back retaining wall 384 is shown in FIGS. 24A and 24B for clarity) that facilitate containing the objects on the conveyor 380. The carrier system 340 receives objects 370, 372, and is mounted on an X-Y stage that includes a horizontally movable stage component 342 and a vertically movable stage component 344. With reference again to FIG. 21B, the carrier system 340 may be moved along the horizontally movable stage component 342 and the vertically movable stage component 344 to position the carrier system 340 between any of the destination locations of the distributions areas 316 that oppose one another (as shown in FIGS. 24A-24B), or may be moved to destination locations of the distribution areas 316 that are on the same side of a distribution area (as shown in FIGS. 23A-23B). FIG. 24A shows the object 370 being ejected to a destination location on a first side of a distribution area while FIG. 24B shows the object 372 being ejected to a destination location of a second side of the distribution area. FIG. 25A shows the object 370 being ejected to a destination location on a first side of a distribution area while FIG. 25B shows the object 372 being ejected to a destination location that is also on the first side of the distribution area (with the second side of the distribution area removed for clarity). In this way, the carrier system 340 may distribute objects to either side of the destination areas. The cleats 382 of the conveyor 380 as well as the retaining walls 384 serve to secure each object when contained by the carrier system.

Figure 26A:
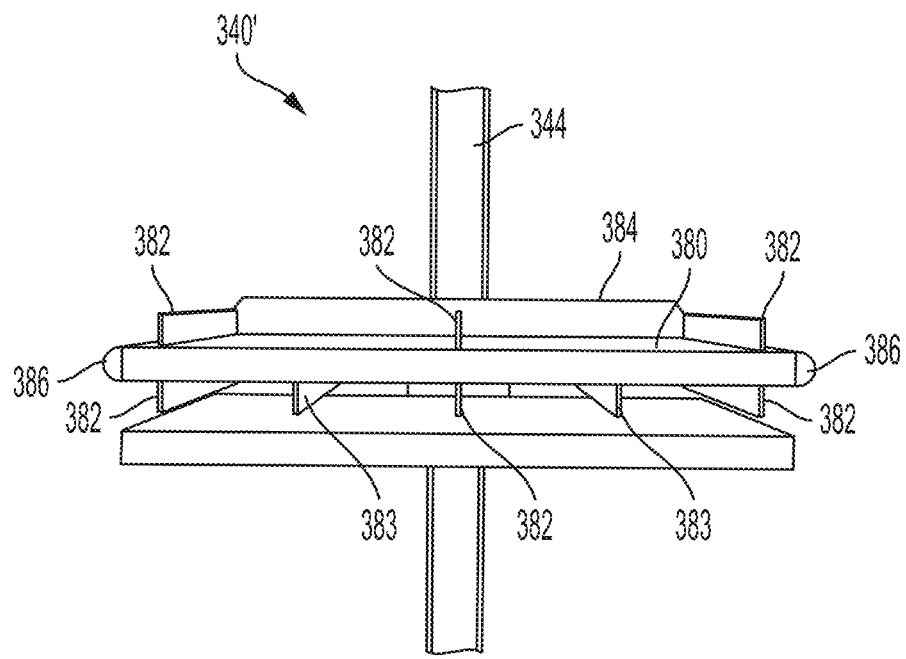
FIGS. 26A and 26B show illustrative diagrammatic enlarged views of a portion of a carrier system for use in an object processing system of the invention that includes a variable divider carrier system showing the carrier system with two divided areas (FIG. 26A) and showing the carrier system with four divided areas (FIG. 26B)
Figure 26B:
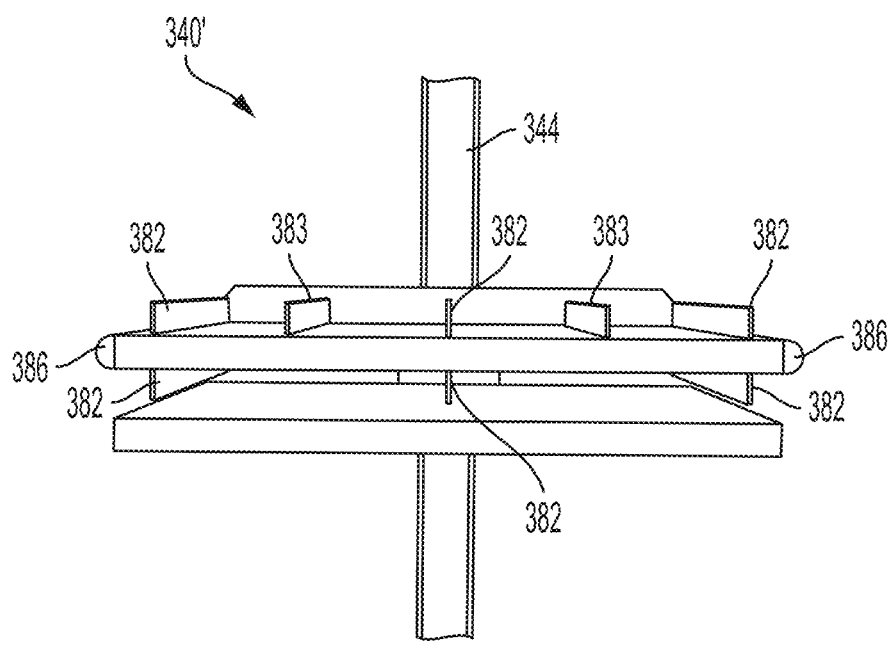

The system may preferably provide that a selected portion of the conveyor is presented to a new object that closely matches a dimension of the object as presented to the carrier system 340. For example, the conveyor 380 of the carrier system 340' may include cleats that are not evenly spaced apart, providing different spacings to better accommodate objects of different sizes as shown in FIGS. 26A, 26B. The carrier system 340' of FIGS. 26A and 23B for example include the conveyor belt 380, cleats 382 and retaining walls 384 (only the back wall is shown for clarity) as well as two additional cleats 383. As shown in FIGS. 26A and 26B, the carrier system may include additional cleats 383 on one side, providing that either of two differently sized containment areas may be presented to the input conveyor for receiving an object. A first (larger) sized containment area may be provided by positioning the conveyor such that the object is received between two cleats 382 (as discussed above), or the conveyor may be rotated one half revolution to present the cleats 383 on the top side, providing that a second (smaller) size containment area may be provided between cleats 382 and 383. Additionally, the end cleats 382 on either side of the rollers 386 may be positioned to receive a further smaller object by positioning both end cleats on the top side of the carrier system.

Figure 27A:
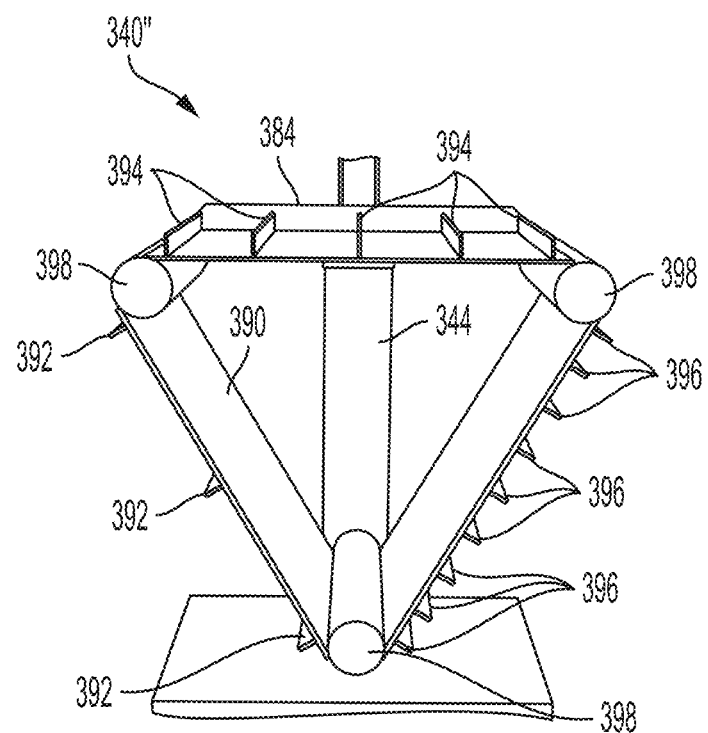
FIGS. 27A and 27B show illustrative diagrammatic enlarged views of a portion of a carrier system for use in an object processing system of the invention that includes a further variable divider carrier system showing the carrier system with four divided areas (FIG. 27A) and showing the carrier system with eight divided areas (FIG. 27B).
Figure 27B:
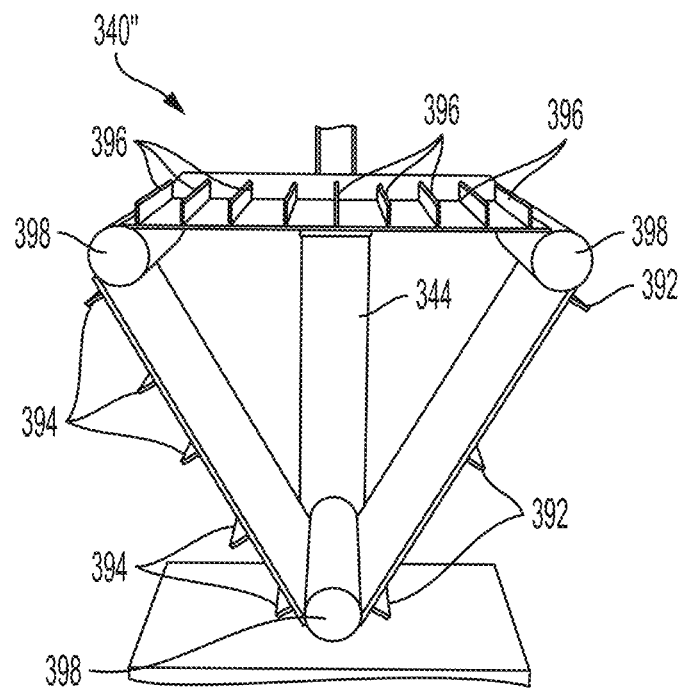

Further, FIGS. 27A and 27B show a carrier system 340" that includes three sections of differently spaced cleats around rollers 398. A first section of the conveyor belt includes cleats 392 on the belt 390, a second section of the conveyor belt includes cleats 394 (providing small containment areas) on the belt, and a third section of the conveyor belt includes cleats 396 (providing still small containment areas). The conveyor belt 390 may be rotated around the rollers 396 to position any of the first, second or third sections on the top of the carrier system 340" to receive particular objects that are best contained by the containment areas provided by the various spacings of the cleats 392, 394, 396. FIG. 27B shows the conveyor belt rotated to bring the cleats 396 to the top of the carrier system 340" providing the smallest size containment areas (e.g., for receiving narrow objects).

Those skilled in the art will appreciate that numerous modifications and variations may be made to the above disclosed embodiments and examples without departing from the spirit and scope of the present invention.

What is claimed is:

1. A carrier system for use in an object processing system, said carrier system comprising:
   a carrier body including a plurality of containment areas for respectively receiving a plurality of objects at a loading station;
   a motion actuator for moving the carrier body from the loading station to a distribution area; and
   an ejection actuation system for actuating the carrier body to deposit each of the plurality of objects into different destination locations,
   the carrier body comprising at least one divided carriage that includes a dividing wall, wherein the plurality of containment areas of the at least one divided carriage are provided on either side of the dividing wall.

2. The carrier system as claimed in claim 1, wherein the loading station includes a conveyor.

3. The carrier system as claimed in claim 1, wherein the at least one divided carriage of the carrier body includes two divided carriages.

4. The carrier system as claimed in claim 3, wherein the two divided carriages travel reciprocally together.

5. The carrier system as claimed in claim 4, wherein the ejection actuation system actuates the two divided carriages simultaneously for discharging objects to adjacent destination locations.

6. The carrier system as claimed in claim 4, wherein the ejection actuation system actuates the two divided carriages individually for discharging objects to non-adjacent destination locations.

7. The carrier system as claimed in claim 1, wherein the ejection actuation system actuates the at least one divided carriage to rotate in a direction generally transverse to a direction of motion of the motion actuator for tipping the at least one divided carriage to drop any of the plurality of objects into the different destination locations.

8. The carrier system as claimed in claim 1, wherein the ejection actuation system actuates the at least one divided carriage to rotate in a direction generally transverse to a direction of motion of the motion actuator at the loading station to facilitate loading objects into any one of the plurality of containment areas.

9. The carrier system as claimed in claim 1, wherein the ejection actuation system provides that the at least one divided carriage is moved in a conveyor direction that is generally transverse to a direction of motion of the motion actuator for moving the at least one divided carriage.

10. An object processing system comprising:
    an input area including a loading station;
    a distribution area including a plurality of destination locations;

a carrier body including a plurality of containment areas for respectively receiving a plurality of objects at the loading station;

a motion actuator for moving the carrier body from the loading station to the distribution area; and an ejection actuation system for actuating the carrier body to deposit each of the plurality of objects into different ones of the plurality of the destination locations, the carrier body comprising at least one divided carriage including a dividing wall, wherein the plurality of containment areas of the at least one divided carriage are provided on either side of the dividing wall.

11. The object processing system as claimed in claim 10, wherein the loading station includes a conveyor.

12. The object processing system as claimed in claim 10, wherein the at least one divided carriage of the carrier body includes two divided carriages.

13. The object processing system as claimed in claim 12, wherein the two divided carriages travel reciprocally together.

14. The object processing system as claimed in claim 12, wherein the ejection actuation system actuates the two divided carriages simultaneously for discharging objects to adjacent destination locations.

15. The object processing system as claimed in claim 12, wherein the ejection actuation system actuates the two divided carriages individually for discharging objects to different destination locations.

16. The object processing system as claimed in claim 10, wherein the ejection actuation system actuates the at least one divided carriage to rotate in a direction generally transverse to a direction of motion of the motion actuator for tipping the at least one divided carriage to drop each of the plurality of objects into the different ones of the plurality of the destination locations.

17. The object processing system as claimed in claim 16, wherein the ejection actuation system actuates the at least one divided carriage to rotate in a direction generally transverse to a direction of motion of the motion actuator at the loading station to facilitate loading objects into any one of the plurality of containment areas.

18. The object processing system as claimed in claim 10, wherein the ejection actuation system provides that the at least one divided carriage is moved in a conveyor direction that is generally transverse to a direction of motion of the motion actuator for moving the at least one divided carriage.

19. A method of processing objects, said method comprising:

providing an input area including a loading station;

providing a distribution area including a plurality of destination locations;

receiving at the loading station a plurality of objects in a plurality of containment areas of a carrier body;

moving the carrier body from the loading station to the distribution area in a first direction; and actuating the carrier body to deposit each of the plurality of objects into different ones of the plurality of the destination locations, the carrier body comprising at least one divided carriage that includes a dividing wall, wherein the plurality of containment areas of the at least one divided carriage are provided on either side of the dividing wall.

20. The method of claim 19, wherein the loading station includes a conveyor.

21. The method of claim 19, wherein the at least one divided carriage of the carrier body includes two divided carriages.

22. The method of claim 21, wherein moving the carrier body includes moving the two divided carriages simultaneously.

23. The method of claim 21, wherein actuating the carrier body to deposit each of the plurality of objects includes actuating the two divided carriages simultaneously for discharging objects to adjacent destination locations.

24. The method of claim 19, wherein the actuating the carrier body to deposit each of the plurality of objects into the different ones of the plurality of the destination locations includes rotating the at least one divided carriage in a direction generally transverse to the first direction to tip the at least one divided carriage to drop each of the plurality of objects into the different ones of the plurality of the destination locations.

25. The method of claim 19, further comprising moving a conveyor to a selected position at which to receive any object with a selected containment area of the at least one divided carriage having a selected size.

26. The carrier system of claim 1, wherein the at least one divided carriage further includes a retention top plate orthogonally disposed on the top of the dividing wall.

27. The object processing system of claim 10, wherein the at least one divided carriage further includes a retention top plate orthogonally disposed on the top of the dividing wall.

28. The method of claim 19, wherein the at least one divided carriage further includes a retention top plate orthogonally disposed on the top of the dividing wall.

* * * * *